United States Patent
Horigome et al.

(10) Patent No.: US 9,858,957 B2
(45) Date of Patent: Jan. 2, 2018

(54) RECORDING CONTROL APPARATUS AND METHOD, DRIVE CONTROLLING CONTROLLER AND METHOD, RECORDING MEDIUM, AND PROGRAM

(71) Applicant: SONY CORPORATION, Tokyo (JP)

(72) Inventors: Junichi Horigome, Tokyo (JP); Hideki Ando, Tokyo (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 15/129,281

(22) PCT Filed: May 14, 2015

(86) PCT No.: PCT/JP2015/063865
§ 371 (c)(1),
(2) Date: Sep. 26, 2016

(87) PCT Pub. No.: WO2015/182393
PCT Pub. Date: Dec. 3, 2015

(65) Prior Publication Data
US 2017/0103779 A1   Apr. 13, 2017

(30) Foreign Application Priority Data
May 28, 2014   (JP) ................. 2014-109691

(51) Int. Cl.
*G11B 20/18*   (2006.01)
*G11B 7/0045*   (2006.01)
(Continued)

(52) U.S. Cl.
CPC ............ *G11B 7/0045* (2013.01); *G11B 7/007* (2013.01); *G11B 20/12* (2013.01)

(58) Field of Classification Search
CPC .......... G11B 20/1217; G11B 2220/216; G11B 27/034; G11B 27/329; G11B 27/34;
(Continued)

(56) References Cited

U.S. PATENT DOCUMENTS

| 7,313,062 | B2 * | 12/2007 | Kobayashi | G11B 7/00736 369/47.1 |
| 8,036,073 | B2 * | 10/2011 | Akiyama | G11B 7/00736 369/47.13 |
| 8,059,512 | B2 * | 11/2011 | Sasaki | G11B 20/10 369/275.3 |

FOREIGN PATENT DOCUMENTS

| JP | 2005-293833 | 10/2005 |
| JP | 2006-351195 | 12/2006 |

(Continued)

*Primary Examiner* — Nabil Hindi
(74) *Attorney, Agent, or Firm* — Paratus Law Group, PLLC

(57) ABSTRACT

The present technology relates to a recording control apparatus, a recording control method, a drive controlling controller, a drive controlling method, a recording medium, and a program capable of reading information more reliably. A manager generates DMSs as management information for managing user data areas and spare areas of an optical disc. Further, the manager records the generated DMS in a DMA area of DS0 of the optical disc, and, in addition, records the generated DMS in a DMA mirror area of the DS1 surface of the optical disc. As described above, since DMSs as management information are recorded in the different areas of the optical disc, even if DMS cannot be read from one area, DMS can be read from the other area. The present technology is applicable to a recording and reproducing apparatus.

48 Claims, 31 Drawing Sheets

(51) Int. Cl.
*G11B 7/007* (2006.01)
*G11B 20/12* (2006.01)

(58) Field of Classification Search
CPC ... G11B 7/0053; G11B 19/12; G11B 20/1883; G11B 2220/20; G11B 2007/0013; G11B 7/24
USPC ............. 369/47.1, 275.2, 53.2, 53.17, 30.11, 369/275.3, 59.25
See application file for complete search history.

(56) References Cited

FOREIGN PATENT DOCUMENTS

| | | |
|---|---|---|
| JP | 4026517 | 10/2007 |
| JP | 2013-054792 | 3/2013 |
| JP | 2013-211081 | 10/2013 |
| WO | WO2012/108178 A1 | 8/2012 |

* cited by examiner

| Data Frame | category | Byte position in Data Frame | Contents | number of bytes |
|---|---|---|---|---|
| 0 | P&C (Pointer&Counter) | 0 | P&C(Pointer&Counter) identifier ="P&C" | 3 |
| 0 | DDS0 | 512<br>2047 | DDS0 identifier ="DS0" | 3 |
| 1 | SRRI0 | 0<br>2047 | SRRI0 identifier ="SR0" | 3 |
| 2 | DFL0 | 0<br>2047 | DFL0 identifier ="DL0" | 3 |
| ⋮ | DFL0 | | | |
| 31 | | 0<br>2047 | | |

| Data Frame | category | Byte position in Data Frame | Contents | number of bytes | |
|---|---|---|---|---|---|
| | SRRIQ Header | 0 | SRRIQ Identifier = "SR0" | 3 | ⎫ |
| | | 3 | SRRIQ revision = 00h | 1 | |
| | | 4 | number of SRR entry on SRRIQ | 4 | ⎬ W31 |
| | | 8 | Reserved and set to 00h | 4 | |
| | | 12 | Reserved and set to 00h | 4 | ⎭ |
| | Number of Open SRRs | 16 | number of Open SRRs | 4 | ⎱ W32 |
| | | 20 | Reserved and set to 00h | 12 | ⎰ |
| | Open SRRI List | 32 | Open SRR number List 1 | 2 | ⎫ |
| | | 34 | Open SRR number List 2 | 2 | |
| | | 36 | Open SRR number List 3 | 2 | |
| | | 38 | Open SRR number List 4 | 2 | |
| | | 40 | Open SRR number List 5 | 2 | |
| | | 42 | Open SRR number List 6 | 2 | |
| | | 44 | Open SRR number List 7 | 2 | |
| | | 46 | Open SRR number List 8 | 2 | ⎬ W33 |
| 1 | | 48 | Open SRR number List 9 | 2 | |
| | | 50 | Open SRR number List 10 | 2 | |
| | | 52 | Open SRR number List 11 | 2 | |
| | | 54 | Open SRR number List 12 | 2 | |
| | | 56 | Open SRR number List 13 | 2 | |
| | | 58 | Open SRR number List 14 | 2 | |
| | | 60 | Open SRR number List 15 | 2 | |
| | | 62 | Open SRR number List 16 | 2 | ⎭ |
| | SRRIQ entries | 64 | SRR entry 1 | 8 | ⎫ |
| | | 72 | SRR entry 2 | 8 | |
| | | 80 | SRR entry 3 | 8 | |
| | | 88 | SRR entry 4 | 8 | |
| | | ⋮ | ⋮ | ⋮ | ⎬ W34 |
| | | 64+(N−1)×8 | SRR entry N | 8 | |
| | | 64+N×8 | SRR Terminator (set to FFh) | 8 | ⎭ |
| | | | set to 00h<br><br>0 ≤ N ≤ 247 | | |

FIG.7

| Data Frame | category | Byte position in Data Frame | Contents | number of bytes |
|---|---|---|---|---|
| 2 | DFL0 Header | 0 | DFL0 identifier = "DFO" | 3 |
| | | 3 | DFL0 revision = 00h | 1 |
| | | 4 | number of DFL entry on DFL0 | 4 |
| | | 8 | Reserved and set to 00h | 4 |
| | | 12 | Reserved and set to 00h | 4 |
| | | 16 | Reserved and set to 00h | 16 |
| | DFL0 entry | 32 | DFL entry 1 | 8 |
| | | 40 | DFL entry 2 | 8 |
| | | 48 | DFL entry 3 | 8 |
| | | . | . | . |
| | | . | . | . |
| | | . | . | . |
| | | 2040 | DFL entry 252 | 8 |
| 3 | | 0 | DFL entry 253 | 8 |
| | | 2040 | DFL entry 508 | 8 |
| 4 | | 0 | DFL entry 509 | 8 |
| | | 2040 | DFL entry 764 | 8 |
| 31 | | 0 | DFL entry 7421 | |
| | | 2036 | DFL entry 7675 | 8 |
| | | 2040 | DFL terminator (set to FFh) | 8 |

Brackets: W41 covers the DFL0 Header rows; W42 covers the DFL0 entry rows through Data Frame 31.

FIG.9

| b63 .. b60 | b59 b58 b57 .. b34 b33 b32 | b31 .. b28 | b27 b26 b25 .. b2 b1 b0 |
|---|---|---|---|
| Operation | Original SPSN | Address mode | Destination SPSN |
| 4bit | 28bit | 4bit | 28bit |

FIG.10

| Operation | Original SPSN | Address mode | Destination SPSN | Type |
|---|---|---|---|---|
| 1000 | SPSN of single defective RUB | x000 | SPSN of Reallocated RUB | RSD |
| 1000 | start SPSN of continuous defective RUB | x001 | start SPSN of Reallocated continuos defective RUB | RCD |
| 1000 | last SPSN of continuous defective RUB | x010 | last SPSN of Reallocated continuos defective RUB | RCD |
| 0000 | SPSN of single defective RUB | 0000 | No Reallocation (set to 00h) | NRSD |
| 0000 | start SPSN of continuous defective RUB | 0001 | No Reallocation (set to 00h) | NRCD |
| 0000 | last SPSN of continuous defective RUB | 0010 | No Reallocation (set to 00h) | NRCD |

FIG. 11

| Data Frame | category | Byte position in Data Frame | Contents | number of bytes | |
|---|---|---|---|---|---|
| 0 | SRRI Header | 0 | SRRI identifier = "SRI" | 3 | ⎫ |
| | | 3 | SRRI revision = 00h | 1 | |
| | | 4 | number of SRR entry on SRRI | 4 | W51 |
| | | 8 | Reserved and set to 00h | 4 | |
| | | 12 | Reserved and set to 00h | 4 | |
| | | 16 | Reserved and set to 00h | 48 | ⎭ |
| | SRR entry | 64 | SRR entry 1 | 8 | |
| | | 72 | SRR entry 2 | 8 | |
| | | 80 | SRR entry 3 | 8 | |
| | | 88 | SRR entry 4 | 8 | |
| | | 96 | SRR entry 5 | . | |
| | | . | . | . | |
| | | . | . | . | |
| | | 2040 | SRR entry 248 | 8 | |
| 1 | | 0 | SRR entry 249 | 8 | |
| | | . | . | . | |
| | | . | . | . | |
| | | . | . | . | |
| | | 2040 | SRR entry 504 | 8 | |
| 2 | | 0 | SRR entry 505 | 8 | |
| | | . | . | . | W52 |
| | | . | . | . | |
| | | . | . | . | |
| | | 2040 | SRR entry 760 | 8 | |
| . | | | | | |
| . | | | | | |
| . | | | | | |
| 31 | | 0 | SRR entry 7929 | 8 | |
| | | . | . | 8 | |
| | | . | . | . | |
| | | 2032 | SRR entry 8183 | . | |
| | | 2040 | SRR terminator(set to FFh) | 8 | ⎭ |

FIG.12

| Data Frame | category | Byte position in Data Frame | Contents | number of bytes | |
|---|---|---|---|---|---|
| 0 | DFL n Header | 0 | DFLn Identifier = "DFn" | 3 | ⎫ |
|  |  | 3 | DFLn revision = 00h | 1 |  |
|  |  | 4 | number of DFL entry on DFLn | 4 | W61 |
|  |  | 8 | Reserved and set to 00h | 4 |  |
|  |  | 12 | Reserved and set to 00h | 4 |  |
|  |  | 16 | Reserved and set to 00h | 16 | ⎭ |
|  | DFL entry | 32 | DFL entry 1 | 8 | ⎫ |
|  |  | 40 | DFL entry 2 | 8 |  |
|  |  | 48 | DFL entry 3 | 8 |  |
|  |  | . | . | . |  |
|  |  | . | . | . |  |
|  |  | . | . | . |  |
|  |  | 2040 | DFL entry 252 | 8 |  |
| 1 |  | 0 | DFL entry 253 | 8 |  |
|  |  | 2040 | DFL entry 508 | 8 |  |
| 2 |  | 0 | DFL entry 509 | 8 | W62 |
|  |  | 2040 | DFL entry 764 | 8 |  |
| . |  |  |  |  |  |
| . |  |  |  |  |  |
| . |  |  |  |  |  |
| 31 |  | 0 | DFL entry 7933 |  |  |
|  |  | 2036 | DFL entry 8187 | 8 |  |
|  |  | 2040 | DFL terminator (set to FFh) | 8 | ⎭ |

FIG.13

RECORDING CONTROL APPARATUS AND METHOD, DRIVE CONTROLLING CONTROLLER AND METHOD, RECORDING MEDIUM, AND PROGRAM

CROSS REFERENCE TO PRIOR APPLICATION

This application is a National Stage Patent Application of PCT International Patent Application No. PCT/JP2015/063865 (filed on May 14, 2015) under 35 U.S.C. §371, which claims priority to Japanese Patent Application No. 2014-109691 (filed on May 28, 2014), which are all hereby incorporated by reference in their entirety.

TECHNICAL FIELD

The present technology relates to a recording control apparatus, a recording control method, a drive controlling controller, a drive controlling method, a recording medium, and a program. The present technology particularly relates to a recording control apparatus, a recording control method, a drive controlling controller, a drive controlling method, a recording medium, and a program capable of reading information more reliably.

BACKGROUND ART

In the past, optical disc recording media (hereinafter simply referred to as optical disc) such as BD (Blu-Ray® Disc), for example, are widely used as write-once optical recording media, which are irradiated with light and record/reproduce signals.

Some optical discs have management areas as areas used for disc management and defect management (for example, see Patent Document 1). Information for managing a recording range, in which data is recorded, is recorded in the management area.

For example, when data cannot be recorded in a recording range of an optical disc, which is specified as an area in which data is to be recorded (to be written), because of defects or another reason, alternating processing is performed. In the alternating processing, data is recorded in an alternate area, which is different from the specified area, in which the data is recorded actually.

When the alternating processing is performed, a defect list showing the recording location of the specified data and the actual recording location of the data and other information are recorded in the management area. When reading data, data is read with reference to the defect list.

Patent Document 1: Japanese Patent No. 4026517

SUMMARY

Problem to be Solved

Meanwhile, when information for managing a recording range is recorded in only one location of an optical disc, and when defects or other problems occur in the management area in which the information is recorded, information recorded in the management area may not be read. Then the newest information about the optical disc such as the defect list and other management information about the optical disc may not be obtained.

Particularly, when the newest information cannot be read from the management area before finalizing the optical disc, data may not be recorded in the optical disc correctly.

The present technology has been made in view of the above-mentioned circumstances, and it is an object of the present technology to read information more reliably.

Means for Solving the Problem

According to a first aspect of the present technology, a recording control apparatus includes: a recording controller that controls recording of data in a write-once recording medium; and a manager that controls the recording controller to record pieces of basic management information in the recording medium, the basic management information storing information on a recording range of the recording medium, the basic management information storing a counter showing the number of times of updating content of the basic management information.

The recording medium may include a first surface capable of recording data and a second surface capable of recording data, and the manager may record the basic management information in the first surface and the second surface.

The basic management information may contain no pointer information showing a recording location of information contained in the basic management information.

The manager may record, when the basic management information having a predetermined size cannot store the information on the recording range anymore, extended management information and new basic management information in the recording medium, the extended management information storing the information on the recording range, the information on the recording range having been stored in the basic management information, the new basic management information storing pointer information showing a recording location of the extended management information in the recording medium.

The manager may record the new basic management information after the manager records the extended management information.

The counter stored in the basic management information may include a counter showing the number of times of updating content of the basic management information and a counter showing the number of times of updating content of the extended management information.

The pieces of basic management information may be recorded in the recording medium before the recording medium is finalized.

According to the first aspect of the present technology, a recording control method or a program includes the step of: controlling a recording controller that controls recording of data in a write-once recording medium to record pieces of basic management information in the recording medium, the basic management information storing information on a recording range of the recording medium, the basic management information storing a counter showing the number of times of updating content of the basic management information.

According to the first aspect of the present technology, controlled is a recording controller that controls recording of data in a write-once recording medium to record pieces of basic management information in the recording medium, the basic management information storing information on a recording range of the recording medium, the basic management information storing a counter showing the number of times of updating content of the basic management information.

According to a second aspect of the present technology, a drive controlling controller includes: a manager that records pieces of basic management information in a write-once recording medium, the basic management information storing information on a recording range of the recording medium, the basic management information storing a counter showing the number of times of updating content of the basic management information.

According to the second aspect of the present technology, a drive controlling method includes the step of: recording pieces of basic management information in a write-once recording medium, the basic management information storing information on a recording range of the recording medium, the basic management information storing a counter showing the number of times of updating content of the basic management information.

According to the second aspect of the present technology, recorded are pieces of basic management information in a write-once recording medium, the basic management information storing information on a recording range of the recording medium, the basic management information storing a counter showing the number of times of updating content of the basic management information.

According to a third aspect of the present technology, a write-once recording medium includes: a recording range; and management areas that record basic management information storing information on the recording range, the basic management information storing a counter showing the number of times of updating content of the basic management information.

The recording medium may further include: a first surface capable of recording data and a second surface capable of recording data, in which the first surface and the second surface may respectively include the management areas.

The basic management information may contain no pointer information showing a recording location of information contained in the basic management information.

When the basic management information having a predetermined size cannot store the information on the recording range anymore, extended management information and new basic management information may be further recorded in the management areas, the extended management information storing the information on the recording range, the information on the recording range having been stored in the basic management information, the new basic management information storing pointer information showing a recording location of the extended management information in the recording medium.

The new basic management information may be recorded in the management areas after the extended management information is recorded in the management areas.

The counter stored in the basic management information may include a counter showing the number of times of updating content of the basic management information and a counter showing the number of times of updating content of the extended management information.

The basic management information may be recorded in the management areas before the recording medium is finalized.

According to the third aspect of the present technology, a write-once recording medium may include: a recording range; and management areas that record basic management information storing information on the recording range, the basic management information storing a counter showing the number of times of updating content of the basic management information.

Effects

According to the first aspect to the third aspect of the present technology, information may be read more reliably.

It should be noted that the effect described here is not necessarily limitative and may be any effect described in the present disclosure.

BRIEF DESCRIPTION OF DRAWINGS

FIG. 4 A diagram illustrating a configuration of PDSD.
FIG. 5 A diagram illustrating a configuration of P&C.
FIG. 6 A diagram illustrating a configuration of DDS0.
FIG. 7 A diagram illustrating a configuration of SRRI0.
FIG. 9 A diagram illustrating a configuration of DFL0.
FIG. 10 A diagram illustrating a configuration of DFL entry.
FIG. 11 A diagram illustrating DFL entry.
FIG. 12 A diagram illustrating a configuration of SRRI1.
FIG. 13 A diagram illustrating a configuration of DFLn.

DESCRIPTION OF PREFERRED EMBODIMENTS

Hereinafter, embodiments to which the present technology is applied will be described with reference to the drawings.

<First Embodiment>

<Optical Disc>
First, a recording medium of the present technology, in which data is recorded and from which data is read, will be described.

For example, in the present technology, a recording medium, from/in which data is read/written, may be any recordable write-once recording medium. Hereinafter, for example, a land-and-groove-format write-once optical disc will be described as a recording medium.

Figure 1:
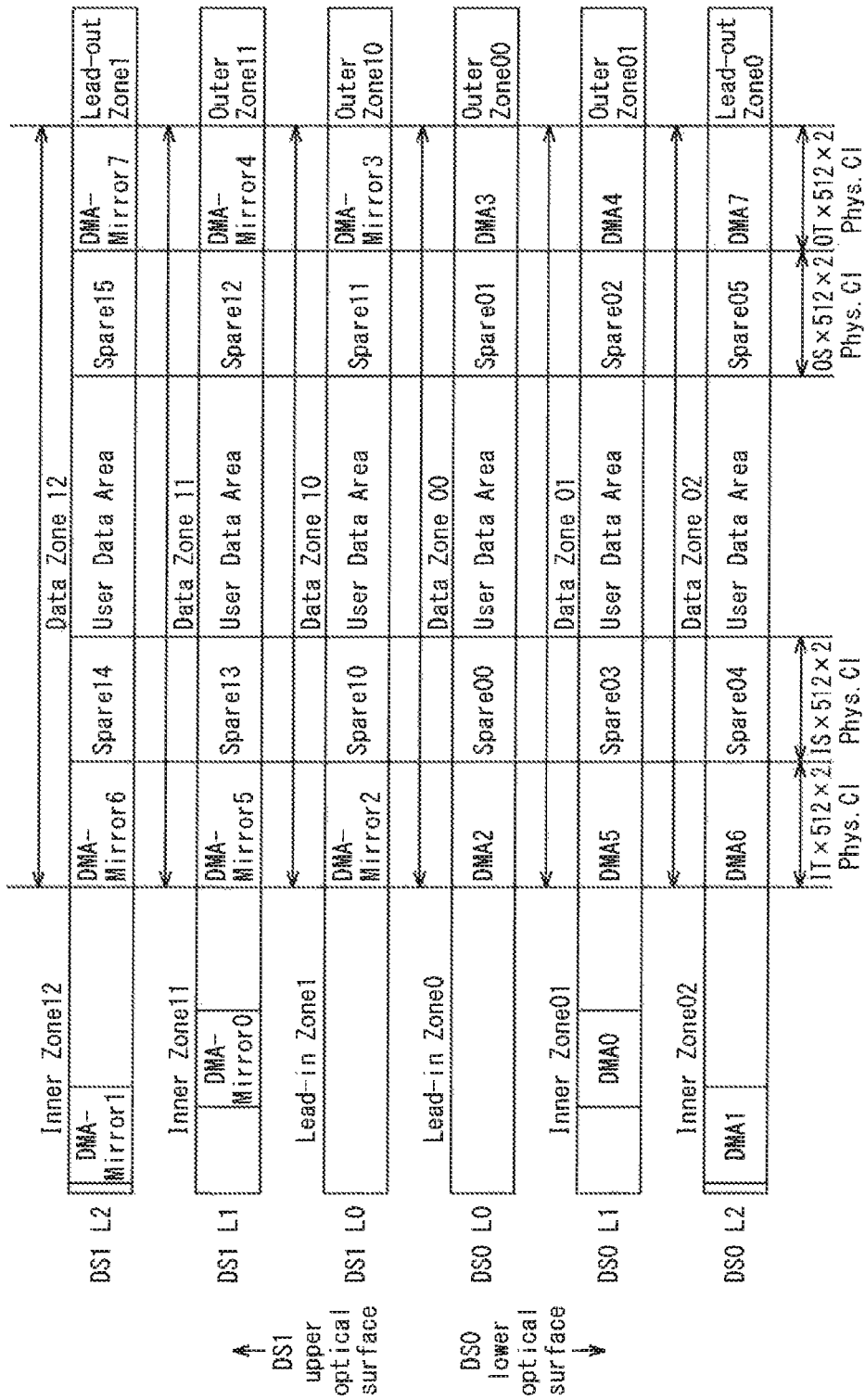
FIG. 1 A diagram illustrating a configuration of an optical disc.

For example, as shown in FIG. 1, such an optical disc includes recording layers.

In the example of FIG. 1, the left side of FIG. 1 shows the inner side of the optical disc, and the right side of FIG. 1 shows the outer side of the optical disc. Further, the optical disc has a DS0 surface and a DS1 surface, and it is possible to read/write data from/in those surfaces simultaneously.

The DS0 surface of the optical disc includes an L0 layer, an L1 layer, and an L2 layer. Similarly, the DS1 surface of the optical disc includes an L0 layer, an L1 layer, and an L2 layer. In the example of FIG. 1, the L2 layer of the DS1 surface, the L1 layer of the DS1 surface, the L0 layer of the DS1 surface, the L0 layer of the DS0 surface, the L1 layer of the DS0 surface, and the L2 layer of the DS0 surface are layered in this order from the upper side to the lower side of FIG. 1.

Note that, hereinafter, each layer may be simply referred to as a layer, when it is not particularly necessary to distinguish between the DS0 surface and the DS1 surface that the layer belongs. In other words, for example, the L1 layer means the L1 layer of the DS0 surface, the L1 layer of the DS1 surface, or the L1 layer of the DS0 surface or the DS1 surface.

Each layer of the DS0 surface and the DS1 surface mainly includes a user data area, spare areas, and DMA (Disk Management Area) areas or DMA mirror areas.

Here, the user data area is an area in which user data, i.e., data specified by a user, is recorded. Typically, when a user instructs to record user data, the user data is recorded in the user data area.

For example, the user data area is divided into some sequential recording ranges, i.e., SRRs (Sequential Recording Ranges). Further, recordable SRRs are open SRRs, and user data is recorded in the open SRRs. When no more user data is written in the SRRs or when user data is written in the whole SRRs, the SRRs are to be closed. Note that some sequential SRRs are sometimes referred to as a session. Further, the SRR includes one or more clusters.

Further, the spare area is an alternate area in which user data is to be recorded in alternating processing. For example, let's say that, although a predetermined area of the user data area is specified as an area in which user data is to be recorded (to be written), the user data cannot be recorded in the specified user data area because of defects or another reason. In this case, the user data is recorded in the spare area, i.e., in which the user data is recorded actually. This is referred to as the alternating processing, in which the user data is recorded in the spare area alternatively.

In FIG. 1, "Spare00" to "Spare05" of the DS0 surface and "Spare10" to "Spare15" of the DS1 surface show spare areas. The optical disc may have, at a maximum, those 12 areas as spare areas.

Specifically, the L0 layer of the DS0 surface has Spare00 at the inner side, the L0 layer of the DS1 surface has Spare10 at the inner side, the L0 layer of the DS0 surface has Spare01 at the outer side, and the L0 layer of the DS1 surface has Spare11 at the outer side.

Further, the L1 layer of the DS0 surface has Spare03 at the inner side, the L1 layer of the DS1 surface has Spare13 at the inner side, the L1 layer of the DS0 surface has Spare02 at the outer side, and the L1 layer of the DS1 surface has Spare12 at the outer side.

Further, the L2 layer of the DS0 surface has Spare 04 at the inner side, the L2 layer of the DS1 surface has Spare14 at the inner side, the L2 layer of the DS0 surface has Spare05 at the outer side, and the L2 layer of the DS1 surface has Spare15 at the outer side.

When continuous defects are detected in a user data area of an optical disc, the area having the continuous defects may be alternated with sequential spare areas according to the alternating processing.

Note that the size of a spare area is determined based on the value of Inner Spare Area Size or Outer Spare Area Size recorded in a management area when formatting an optical disc.

Here, the Inner Spare Area Size of each layer of the DS0 surface and the DS1 surface is, for example, $2 \times 512 \times IS$ (where $0 \leq IS \leq TBD$ is satisfied where TBD is a predetermined value) or the like. Further, the Outer Spare Area Size of each layer of the DS0 surface and the DS1 surface is, for example, $2 \times 512 \times OS$ (where $0 \leq OS \leq TBD$ is satisfied) or the like. In such cases, the total size of the spare areas of the whole optical disc is $1024 \times IS \times 2 \times 3 + 1024 \times OS \times 2 \times 3$.

Further, the DMA areas and the DMA mirror areas of the optical disc are management areas in which management information for managing the user data areas and the spare areas is recorded. Each layer of the DS0 surface has the DMA areas, and each layer of the DS1 surface has the DMA mirror areas.

In the example of FIG. 1, each of "DMA0" to "DMA7" of the DS0 surface shows the DMA area, and each of "DMA-Mirror0" to "DMA-Mirror7" of the DS1 surface shows the DMA mirror area.

Specifically, DMA 0 of the inner zone of the L1 layer of the DS0 surface, DMA1 of the inner zone of the L2 layer of the DS0 surface, DMA-Mirror0 of the inner zone of the L1 layer of the DS1 surface, and DMA-Mirror1 of the inner zone of the L2 layer of the DS1surface are predetermined fixed areas.

To the contrary, DMA2 of the inner side of the L0 layer of the DS0 surface, DMA-Mirror2 of the inner side of the L0 layer of the DS1 surface, DMA3 of the outer side of the L0 layer of the DS0 surface, and DMA-Mirror3 of the outer side of the L0 layer of the DS1 surface are user-settable areas.

Similarly, DMA4 of the outer side of the L1 layer of the DS0 surface, DMA-Mirror4 of the outer side of the L1 layer of the DS1 surface, DMA5 of the inner side of the L1 layer of the DS0 surface, DMA-Mirror5 of the inner side of the L1 layer of the DS1 surface, DMA6 of the inner side of the L2 layer of the DS0 surface, DMA-Mirror6 of the inner side of the L2 layer of the DS1 surface, DMA7 of the outer side of the L2 layer of the DS0 surface, and DMA-Mirror7 of the outer side of the L2 layer of the DS1 surface are user-settable areas.

Each DMA area of the DS0 surface is an area for the alternating processing. The DMA areas of the DS0 surface manage alternate information, which is information on the alternating processing for the whole optical disc, i.e., the DS0 surface and the DS1 surface. The information record in the DMA areas is also recorded in the DMA mirror areas of the DS1 surface, whereby information is duplexed.

In the example of FIG. 1, the DMA areas are used in the order of DMA0, DMA1, DMA2, DMA3, DMA4, DMA5, DMA6, and DMA7. In other words, management information including alternate information is recorded in the DMA areas in the order from DMA0 to DMA7.

Each of DMA0 and DMA1 out of those DMA areas has a fixed size. Further, the size of each DMA area other than DMA0 and DMA1 may be determined based on setting information when formatting the optical disc. In other words, each of DMA2 to DMA7 has a variable size.

In this case, the size of a DMA area is determined based on the value of Inner DMA/DMA-Mirror Area Size or Outer DMA/DMA-Mirror Area Size, which is recorded in a management area when formatting the optical disc.

Specifically, each size of DMA2, DMA5, and DMA6 is, for example, 2×512×IT (where 0≤IT≤TBD is satisfied where TBD is a predetermined value) or the like. Further, each size of DMA3, DMA4, and DMA7 is, for example, 2×512×OT (where 0≤OT≤TBD is satisfied) or the like.

Similarly to the DMA area, each DMA mirror area of the DS1 surface is an area for the alternating processing. The DMA mirror areas of the DS1 surface manage alternate information, which is information on the alternating processing for the whole optical disc, i.e., the DS0 surface and the DS1 surface. The information record in the DMA mirror areas is also recorded in the DMA areas of the DS0 surface, whereby information is duplexed.

In the example of FIG. 1, the DMA mirror areas are used in the order of DMA-Mirror0, DMA-Mirror1, DMA-Mirror2, DMA-Mirror3, DMA-Mirror4, DMA-Mirror5, DMA-Mirror6, and DMA-Mirror7. In other words, management information is recorded in the DMA mirror areas in the order from DMA-Mirror0 to DMA-Mirror7.

Each of DMA-Mirror0 and DMA-Mirror1 out of those DMA mirror areas has a fixed size. Further, the size of each DMA mirror area other than DMA-Mirror0 and DMA-Mirror1 may be determined based on setting information when formatting the optical disc.

In this case, the size of a DMA mirror area is determined based on the value of Inner DMA/DMA-Mirror Area Size or Outer DMA/DMA-Mirror Area Size, which is recorded in a management area when formatting the optical disc.

Specifically, each size of DMA-Mirror2, DMA-Mirror5, and DMA-Mirror6 is, for example, 2×512×IT (where 0≤IT≤TBD is satisfied) or the like. Further, each size of DMA-Mirror3, DMA-Mirror4, and DMA-Mirror7 is, for example, 2×512×OT (where 0≤OT≤TBD is satisfied) or the like.

Further, the optical disc has a DMA anchor area (not shown). When the alternating processing is generated in DMA areas or DMA mirror areas, fragmentation information of the DMA areas or the DMA mirror areas is recorded in the DMA anchor area. In other words, every time fragments (alternating processing) are generated in the DMA areas or the DMA mirror areas because of defects or another reason, information on the fragments is recorded.

Figure 2:
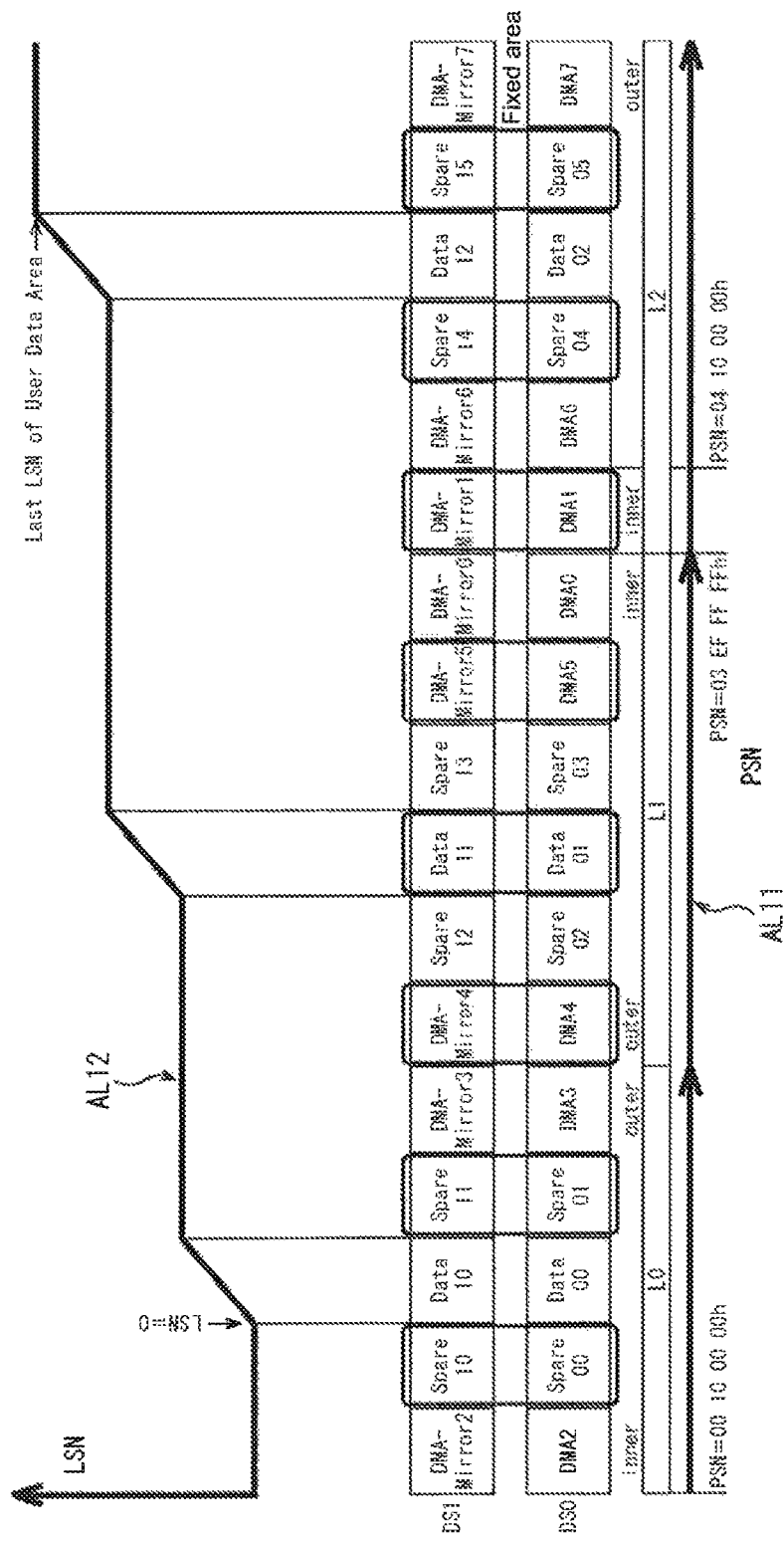
FIG. 2 A diagram illustrating a configuration of the optical disc.

Further, FIG. 2 shows the areas of the optical disc of FIG. 1 arrayed in the order of PSN (Physical Sector Number) from the inner side of the L0 layer to the outer side of the L2 layer. Note that the areas of FIG. 2 corresponding to the areas of FIG. 1 are denoted by the same names, and the description thereof will be omitted arbitrarily.

FIG. 2 shows PSN and LSN (Logical Sector Number) of each area of the optical disc. In other words, each line shown by the arrow AL11 shows PSN of the location of each area. Each line shown by the arrow AL12 shows LSN of the location of each area.

Here, PSN is a physical address showing a physical location of the recording ranges of the optical disc. LSN is a logical address showing a location of a user data area.

In this example, data is recordable independently in the DS0 surface and the DS1 surface of the optical disc, and therefore PSN and LSN of one location of the DS0 surface are the same as the corresponding location of the DS1 surface.

For example, PSN recorded on the DS0 surface of the optical disc as wobble information is the same as PSN recorded on the DS1 surface as wobble information. However, when distinguishing a location on the DS0 surface and a location on the DS1 surface as the location (area) shown by PSN, surface information, which shows the DS0 surface or the DS1 surface, is added to the most significant bit of PSN as necessary, and SPSN is generated.

Specifically, "0", which means the DS0 surface, is added to the most significant bit of PSN of the DS0 surface, and the SPSN is generated. Similarly, "1", which means the DS1 surface, is added to the most significant bit of PSN of the DS1 surface, and the SPSN is generated.

<DMS>

Meanwhile, as described above, management information is recorded in the DMA areas and the DMA mirror areas as the management areas. The management information is referred to as DMS (Disc Management Structure), for example. Further, DMS including fragmentation information is recorded in the DMA anchor area as necessary.

Figure 3:
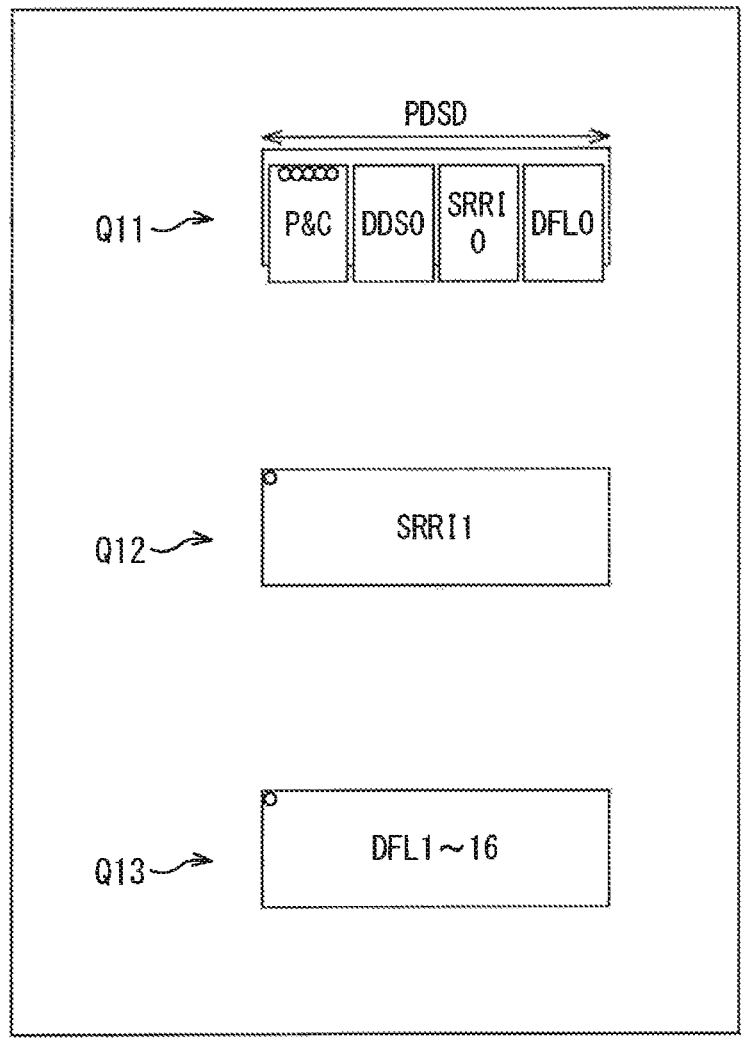
FIG. 3 A diagram illustrating a configuration of DMS.

For example, as shown in FIG. 3, DMS includes PDSD (Pointer & Counter, Disk Definition Structure, Sequential Recording Range Information 0 and Defect List 0 ), i.e., basic management information having a predetermined size, and SSRI (Sequential Recording Range Information) 1 and DFL (Defect List) n (where n=1, . . . , 16), i.e., extended management information.

Specifically, PDSD shown by the arrow Q11 is information, which is the basic configuration of the size of 1 RUB (Recording Unit Block), i.e., a predetermined recording block (block). PDSD includes P&C (Pointer & Counter), DDS (Disk Definition Structure) 0, SRRI (Sequential Recording Range Information) 0, and DFL0. Here, 1 RUB is 1 cluster, and a cluster contains 32 sectors.

P&C contains various pointers and counters. DDS0 contains information that shows the location of the spare area in which data is recorded. The data volume of P&C and DDS0 is the same as the data volume of 1 frame.

SRRI0 is a data of 1 frame. SRRI0 contains disc information showing a location of each SRR in the user data areas, i.e., SRR entries showing the locations of the SRRs of the user data areas. Note that, more specifically, SRRI0 is used as a temporary area for recording the SRR entries, i.e., a work area.

DFL0 is data of 30 frames. DFL0 contains alternate information, i.e., information on the alternating processing. In other words, DFL0 records information on DFL entries of a user-data recording location (hereinafter, also referred to as alternate-origin) specified by a user when performing the alternating processing, and of an actual recording location (hereinafter, also referred to as alternate-destination) of user data recorded in the alternating processing, and other information.

DFL entry is a defect list showing areas in which defects occurred, i.e., alternate-origin areas, and alternate-destination areas therefor. Note that, more specifically, some DFL entries show alternate-origins and alternate-destinations, and other DFL entries show areas having defects in recording ranges such as user data areas and spare areas.

DFL0 is used as a temporary area for recording DFL entries, i.e., a work area.

Further, SRRI1 shown by the arrow Q12 is an extended unit for information on SRR, i.e., SRRI. The size of SRRI1 is the same as the size of 1 RUB. SRRI1 is generated when SRRI0 cannot record SRR entries, and is used as an extended area for SRRI. In this case, when SRRI0 records SRR entries of open SRR, the SRR entries are remained in SRRI0. The remaining SRR entries, i.e., SRR entries of closed SRR in which data is not to be record thereafter, are recorded in SRRI1.

The above-mentioned P&C contains SPSN at the front location of SRRI1 as a pointer showing the start location of SRRI1.

Further, DFLn (where n=1, . . . , 16) shown by the arrow Q13 is information on defects, i.e., an extended unit for DFL. The size of DFLn is the same as the size of 1 RUB. DFLn is generated when DFL entries cannot be recorded in DFL0anymore. DFLn is used as an extended area for DFL. In this case, all the DFL entries recorded in DFL0are flushed (moved) and are recorded in DFLn, whereby no DFL entry is recorded in DFL0. Further, redundant DFL entries are excluded in DFL1 to DFL16, and the DFL entries are sorted and recorded.

The above-mentioned P&C contains SPSN at the front location of each DFLn as a pointer showing the start location of DFLn.

In short, DMS only includes PDSD, in principle. However, when SRRI or DFL is extend, DMS includes, in addition to PDSD, SRRI1 or DFLn as necessary.

<PDSD>

Next, the above-mentioned PDSD, SRRI1, and DFLn will be described in more detail. First, PDSD will be described.

FIG. 4 shows an example of a configuration of PDSD.

Data Frame 0, i.e., the front frame of PDSD, contains the above-mentioned P&C and DDS0. Further, Data Frame 1 next to Data Frame contains SRRI0. Further, Data Frame 2 to Data Frame 31 contain DFL0.

<P&C>

Figure 5:
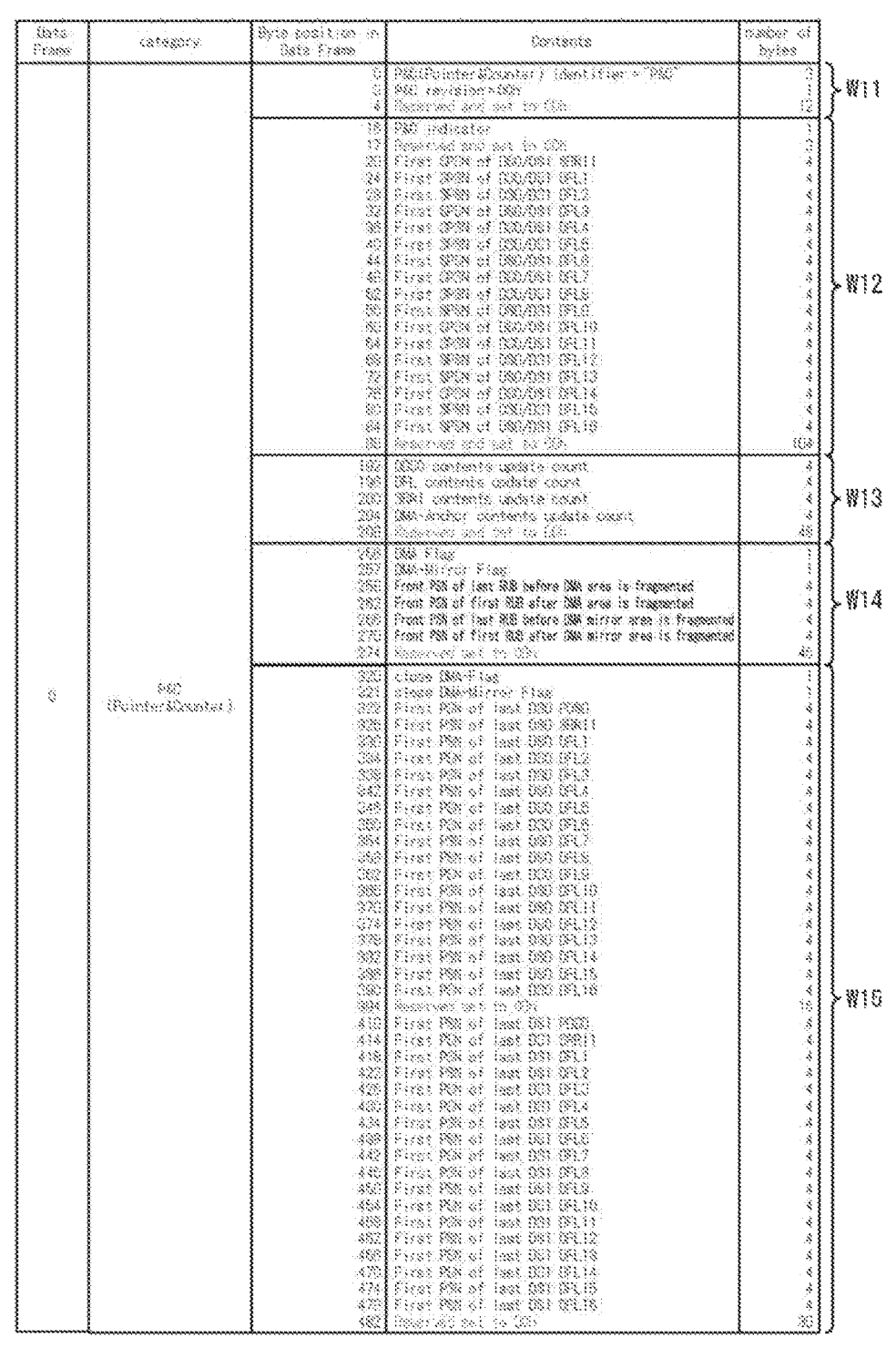

FIG. 5 shows an example of a configuration of P&C.

P&C is in the area from byte 0 to byte 511 of Data Frame 0 of PDSD. The part W11 in the front of P&C is the header area of P&C. Further, the part W12 next to the part W11 contains the P&C indicator showing an area such as a DMA area and a DMA mirror area, in which DMS including the P&C is recorded.

For example, when the recording location of DMS containing the P&C is a DMA area of the DS0 surface, the P&C indicator value is 00h. When the recording location of DMS is a DMA mirror area of the DS1 surface, the P&C indicator value is 01h. Further, when the recording location of DMS is a DMA anchor area, the P&C indicator value is 02h, 03h, or 04h depending on a recording location area in the DMA anchor area, finalization, or the like. Specifically, when an optical disc is finalized, the P&C indicator value is 04h.

Further, the part W12 of P&C contains pointers showing the start locations of the recording locations of SSRI1 and DFL1 to DFL16 of DMS containing the P&C.

For example, First SPSN of DS0/DS1 SRRI1 shows SPSN of the front location of SRRI1. Further, First SPSN of DS0/DS1 DFL1 shows SPSN of the front location of DFL1.

Here, the value of First SPSN of DS0/DS1 SRRI1, i.e., the pointer showing the start location of the recording location of SSRI1, is 00h when SRRI is not extended, i.e., when no SRRI1 is provided. Further, also when the P&C indicator value is any one of 02h to 04h, the value of First SPSN of DS0/DS1 SRRI1 is 00h.

Similarly, the value of the pointer showing the start location of the recording location of DFLn such as First SPSN of DS0/DS1 DFL1 is 00h when no DFLn is provided. Further, also when the P&C indicator value is any one of 02h to 04h, the value of the pointer showing the start location of the recording location of DFLn is 00h.

As described above, in principle, DMS recorded in a DMA area is the same as DMS recorded in a DMA mirror area. Note that the values of the pointers of the part W12 of P&C of each DMS are SPSN, which distinguishes the DS0 surface and the DS1 surface. So the part W12 of P&C of a DMA area is different from the part W12 of P&C of a DMA mirror area.

The part W13 next to the part W12 contains the number of times of updating respective information, i.e., a counter showing version information of the respective information. Specifically, the part W13 contains DDS0contents update count, DFL contents update count, SRRI contents update count, and DMA-Anchor contents update count.

DDS0 contents update count is a counter showing the number of times of updating DDS0. DDS0 contents update count is incremented only when the content of DDS0 is updated (changed).

DFL contents update count is a counter showing the number of times of updating DFL. DFL contents update count is incremented only when the content of DFL0, DFLn (where n=1, . . . , 16), or DFL0 and DFLn is updated (changed). In short, it is incremented only when a DFL entry is newly added.

SRRI contents update count is a counter showing the number of times of updating SRRI. SRRI contents update count is incremented when the content of SRRI0 , SRRI1, or SRRI0 and SRRI1 is updated (changed). In short, it is incremented only when the content of an SRR entry is changed or an SRR entry is newly added.

DMA-Anchor contents update count is incremented only when a fragment occurs in a DMA area or a DMA mirror area and fragmentation information (DMS) is recorded in a DMA anchor area.

Each value of DDS0contents update count, DFL contents update count, and SRRI contents update count of the part W13 is not incremented (counted up) as long as the content is not changed when, for example, PDSD, SRRI1 , or DFLn is rewritten because a defect occurs in a DMA area or a DMA mirror area, or because of another reason. This is for ensuring consistency between counter values of P&C recorded in a DMA area and counter values of P&C recorded in a DMA mirror area.

For example, if DDS0contents update count or the like of P&C is incremented when a defect occurs in recording DMS in a DMA area and DMS is rewritten in another area in a DMA area in the alternating processing or the like, the value is inconsistent with DDS0 contents update count of P&C recorded in a DMA mirror area, and it is difficult tell which DMS is the newest.

Similarly, DMA-Anchor contents update count is not incremented when a DMA anchor area has a defect or the like and DMS is rewritten or the like. Further, one common DMA-Anchor contents update count is used for a fragment of a DMA area and for a fragment of a DMA mirror area. In short, the same DMA-Anchor contents update count is incremented when a DMA area has a fragment or when a DMA mirror area has a fragment.

The part W14 of P&C contains information, which is recorded when DMS containing the P&C is recorded in a DMA anchor area.

In short, DMA Flag contains flags showing if a trouble and a fragment occur in a DMA area. DMA-Mirror Flag contains flags showing if a trouble and a fragment occur in a DMA mirror area.

Specifically, DMA Flag contains a DMA trouble flag showing if a trouble occurs in a DMA area or not, and a DMA fragment flag showing if a fragment occurs in a DMA area or not. Similarly, DMA-Mirror Flag contains a DMA mirror trouble flag showing if a trouble occurs in a DMA mirror area, and a DMA mirror fragment flag showing if a fragment occurs in a DMA mirror area or not.

Further, the part W14 of P&C contains, as fragmentation information, front PSN of last RUB before DMA area is fragmented, front PSN of first RUB after DMA area is fragmented, front PSN of last RUB before DMA mirror area is fragmented, and front PSN of first RUB after DMA mirror area is fragmented. The information can identify recording locations of a DMA area and a DMA mirror area before and after fragmentation because of a defect or the like.

Values are recorded in the part W14 only when DMS is recorded in a DMA anchor area, and the values of the part W14 are 00h if not.

Values are recorded in the part W15 only when DMS is recorded in a DMA anchor area when a DMA anchor area is closed, i.e., when an optical disc is finalized. The part W15 records, for example, pointers showing start locations of recording locations of DFLn such as PDSD, SRRI1, and DFL1 to DFL16 finally recorded in a DMA area and a DMA mirror area, i.e., the final locations of the DS0 surface and the DS1 surface. Note that those pointer values are 00h when a optical disc is not finalized.

<DDS0>

Figure 6:
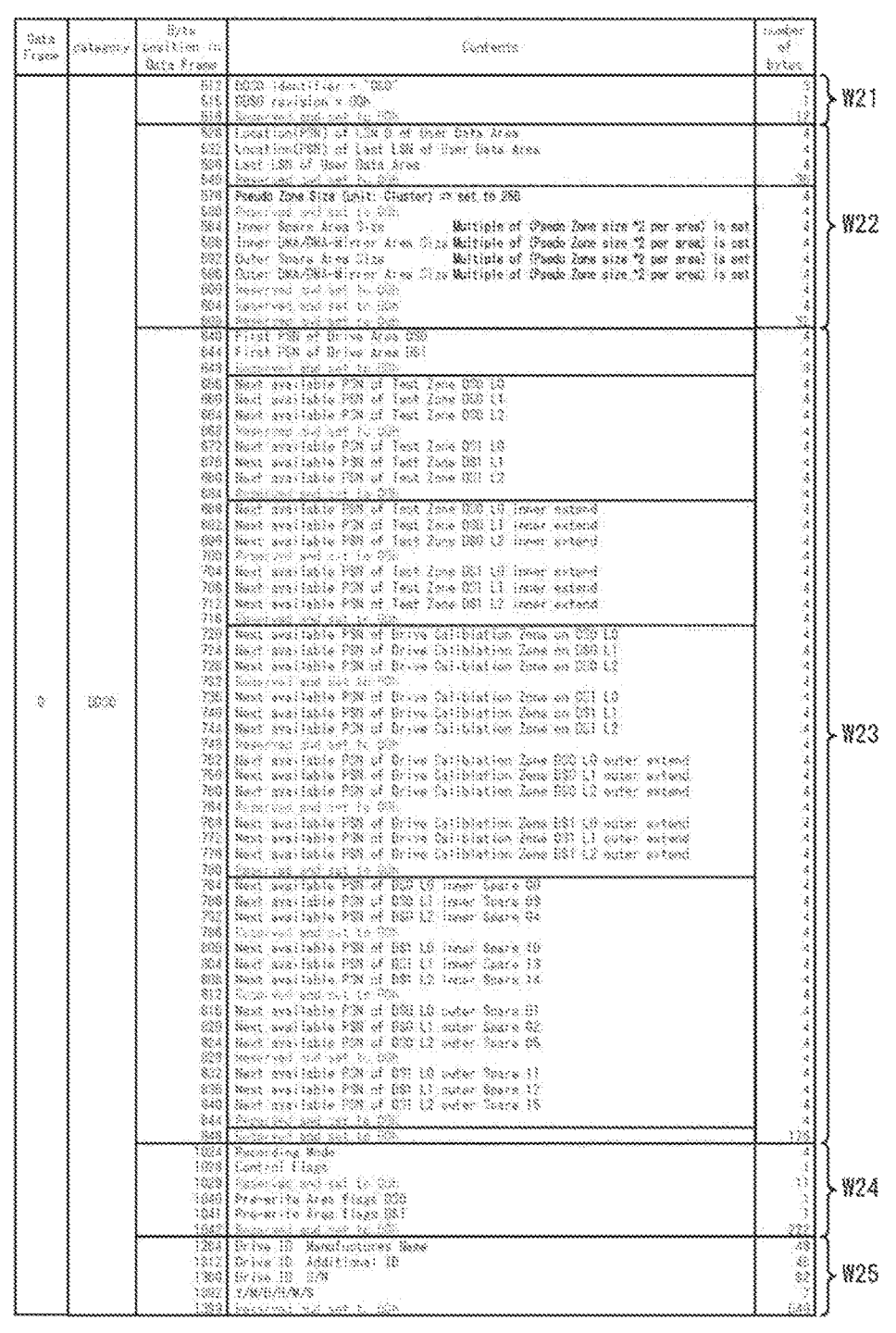

Further, FIG. 6 shows an example of a configuration of DDS0of PDSD.

DDS0 is in the area from byte 512 to byte 2047 of Data Frame 0 of PDSD. The part W21 of DDS0 records header information of DDS0. Further, the part W22 records information on the configuration of the optical disc, configuration of spare areas, and the like. For example, the part W22 records, for example, Inner Spare Area Size, Inner DMA/DMA-Mirror Area Size, Outer Spare Area Size, and Outer DMA/DMA-Mirror Area Size, which determine the sizes of spare areas, DMA areas, and DMA mirror areas.

The part W23 records information showing locations of areas of the optical disc, in which information is recorded. For example, the part W23 records information showing PSN showing the first location of next recordable locations of each spare area, i.e., each area from Spare00 to Spare15 of FIG. 1.

Specifically, for example, Next available PSN of DS0 L0 inner Spare00 of the part W23 shows the PSN of the first location of next recordable locations of Spare00of the L0 layer of the DS0 surface. In other words, when user data is recorded in Spare00 as a spare area in the next alternating processing, user data is to be recorded firstly in this PSN location. Further, when the area of Spare00 is full and user data cannot be recorded in Spare00 anymore, FFh is recorded for the value of Next available PSN of DS0L0inner Spare00. It applies to not only Spare00 but also the other Next available PSNs.

Further, for example, Next available PSN of DS1 L0 inner Spare10 of the part W23 shows PSN of the first location of next recordable locations of Spare10 of the L0 layer of the DS1 surface.

As described above, the part W23 contains information showing PSNs showing next recordable areas of spare areas of the respective layers of the DS0 surface and the DS1 surface. In other words, when the Next available PSN values of all the spare areas of the DS0 surface and the DS1 surface are FFh, it means that there is no recordable spare area anymore.

Further, the part W24 records information such as control Flags, which show if DMS containing DDS0 is temporary, i.e., provisional and tentative, or not. Here, when Temporary DMS value contained in control Flags is 1, it means that DMS is temporary. When Temporary DMS value contained in control Flags is 0, it means that DMS is not temporary.

Further, the part W25 records information on Drive ID.

<SRRI0>

Further, FIG. 7 shows an example of a configuration of SRRI0 of PDSD.

SRRI0 is in the Data Frame 1 area of PDSD. The front part W31 of SRRI0 is an SRRI0 header area. The header area contains, for example, number of SRR entry on SRRI0, which shows the total number of the SRR entries of SRRI0. The part W32 next to the part W31 records number of open SRRs, which shows the number of open SRRs (sequential recording ranges).

Further, the part W33 records a list of open SRRs. Further, the part W34 records SRR entries and SRR terminator. The part W34 has a predetermined size. Because of this, SRRI0 can store only a predetermined number of SRR entries. Further, for example, SRR entry 1 of the part W34 shows the 1st SRR entry of SRRI0.

Figure 8:
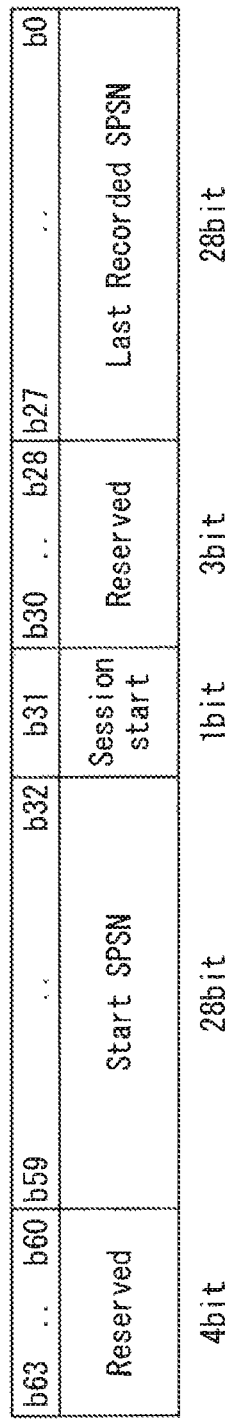
FIG. 8 A diagram illustrating a configuration of SRR entry.

Here, FIG. 8 shows an example of a configuration of each SRR entry.

In this example, each SRR entry contains Start SPSN, Session start, and Last Recorded SPSN. Each SRR entry is information of 64-bit length (size).

Start SPSN shows a front location of SRR identified by the SRR entry, i.e., SPSN of a front sector of a front cluster, more specifically. Further, Last Recorded SPSN shows the last location of data recorded in SRR identified by the SRR entry, i.e., SPSN of a sector containing last user data recorded in SRR.

In other words, SRR identified by SRR entry records user data from the location shown by Start SPSN to the location shown by Last Recorded SPSN. Further, when user data is to be recorded in the SRR, the user data is to be recorded in the front sector or the location after the front sector of the cluster next to the cluster containing the sector shown by Last Recorded SPSN.

Further, Session start in an SRR entry shows if SRR identified by the SRR entry is the first (front) SRR of a session including SRRs or not. Specifically, for example, the Session start value is 1 when SRR is the first SRR of a session. The Session start value is 0 when SRR is not the first SRR of a session.

SRR entries are arrayed (sorted) where the 64-bit SRR entries are treated as a 64-bit integer value. In this case, the most significant integer value is SPSN at the front location of SRR. So SRR entries are arrayed in the order of address, i.e., in the order of SPSN. As a result, with reference to the arrayed SRR entries, it is possible to search for the target SRR entry faster conveniently.

<DFL0>

FIG. 9 shows an example a configuration of DFL0 of PDSD.

DFL0 is in the Data Frame 2 to Data Frame 31 areas of PDSD. The part W41 of DFL0 is a DFL0 header area. The header area contains, for example, number of DFL entry on DFL0, which shows the total number of the DFL1 entries of DFL0.

The part W42 next to the part W41, i.e., the part from the middle of Data Frame 2 to Data Frame 31 of DFL0, records DFL entries and DFL terminator. The part W42 has a predetermined size. Because of this, DFL0 can store only a predetermined number of DFL entries. Further, for example, DFL entry 1 of the part W42 shows the 1st DFL entry of DFL0.

Note that it is possible to determine whether DFL0 cannot record DFL entries anymore and DFL is extended or not based on the above-mentioned pointer information of P&C, i.e., First SPSN of DS0/DS1 DFL1 to First SPSN of DS0/DS1 DFL16, specifically. In other words, generated DFLns are determined, and DFLns that record DFL entries are determined.

Here, FIG. 10 shows an example of a configuration of each DFL entry.

In this example, each DFL entry contains Operation, Original SPSN, Address mode, and Destination SPSN. Each DFL entry is information of 64-bit length (size).

Original SPSN is 28-bit information, and shows the location of a recording range (cluster) having defects of the optical disc. The area shown by Original SPSN may show an alternate-origin location of the alternating processing, or may merely show a registered location of the area having defects, i.e., not the alternate-origin. Destination SPSN is 28-bit information, and shows the location of an alternate-destination.

Operation is operation information showing if the DFL entry is an entry showing an alternate-destination and an alternate-origin, or an entry not showing an alternate-target area but showing an area having defects, which is merely registered as an unusable area.

Address mode is address mode information showing an alternate address mode, i.e., showing if the DFL entry handles a defect of a single cluster (Physical Cluster) or defects of continuous clusters, for example.

For example, as shown in FIG. 11, each DFL entry can describe if the DFL entry handles an isolated single defect or continuous defects, and can further describe if the defect(s) is/are alternated or not.

For example, as shown in FIG. 11, the Operation value is 1000 when (a) defect(s) that the DFL entry handles is/are alternated, and the Operation value is 0000 when (a) defect(s) is/are not alternated.

Further, the Address mode value is 0000 when the DFL entry handles a registered single defect or a single defect, which is an alternate-origin.

Further, when the DFL entry handles continuous defects (defects of continuous clusters), the Address mode value is 0001 or 0010 depending on the Original SPSN of defects that the DFL entry handles.

So defects that the DFL entry handles are sorted into 4 kinds, i.e., RSD, RCD, NRSD, and NRCD, denoted by "Type" in the right side of FIG. 11, based on Operation and Address mode. In other words, the kind of defects is determined based on Operation and Address mode described in the DFL entry.

So information including Operation and Address mode is information showing the kind of defects.

Here, RSD shows an alternated single defect, RCD shows alternated continuous defects, NRSD shows an unalternated single defect, and NRCD shows unalternated continuous defects.

DFL entries are arrayed (sorted) in ascending order where the 64-bit DFL entries are treated as a 64-bit integer value. In this case, the most significant integer value is the Operation value. So DFL entries having unalternated defects are arranged in the first part, and DFL entries having alternated defects are arranged thereafter. As a result, with reference to the arrayed DFL entries, it is possible to search for the target DFL entry faster conveniently.

<SRRI1>

Further, FIG. 12 shows an example of a configuration of SRRI1 of DMS.

The front part W51 of SRRI1 is an SRRI1 header area. The header area contains, for example, number of SRR entry on SRRI1, which shows the total number of the SRR entries of SRRI1. The part W52 next to the part W51 records SRR entries and SRR terminator. For example, SRR entry 1 of the part W52 shows the 1st SRR entry of SRRI1.

<DFLn>

FIG. 13 shows an example of a configuration of each DFLn, i.e., each of DFL1 to DFL16, of DMS.

The part W61 of DFLn is a DFLn header area. The header area contains, for example, number of DFL entry on DFLn, which shows the total number of the DFL entries of DFLn.

The part W62 next to the part W61 records DFL entries and DFL terminator. For example, DFL entry 1 of the part W62 shows the 1st DFL entry of DFLn.

<Example of Configuration of Recording and Reproducing Apparatus>

Figure 14:
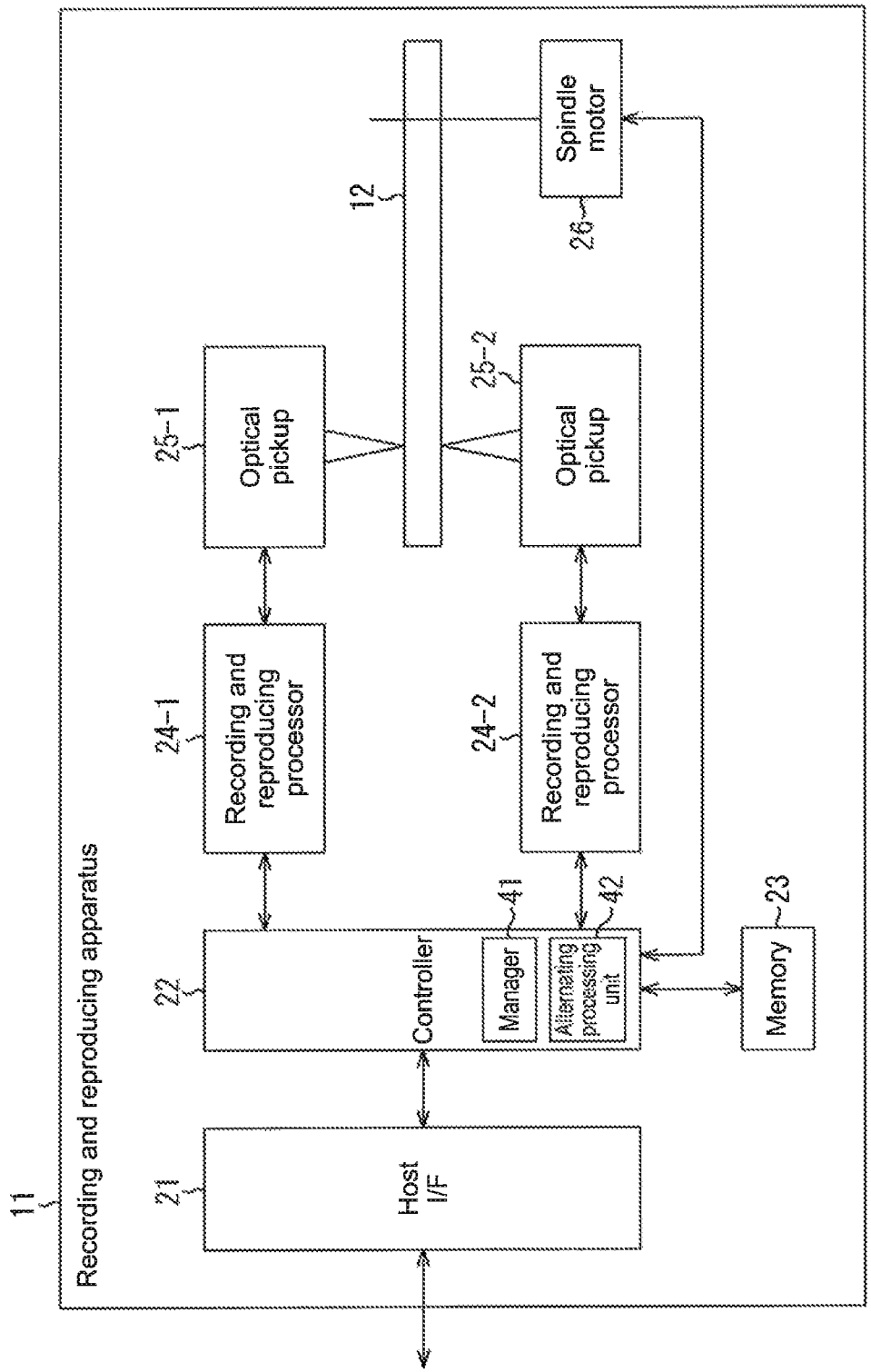
FIG. 14 A diagram illustrating a configuration example of a recording and reproducing apparatus.

Next, a configuration example of a recording and reproducing apparatus of an embodiment to which the present technology is applied will be described. FIG. 14 shows an example of a configuration of a recording and reproducing apparatus to which the present technology is applied.

The recording and reproducing apparatus 11 of FIG. 14 reads/writes data from/in the optical disc 12 having the above-mentioned configuration, and is an optical disc drive, for example.

The recording and reproducing apparatus 11 includes the host I/F (Interface) 21, the controller 22, the memory 23, the recording and reproducing processor 24-1, the recording and reproducing processor 24-2, the optical pickup 25-1, the optical pickup 25-2, and the spindle motor 26.

The host I/F 21 communicates with a host apparatus (not shown), and sends/receives data and commands. For example, the host I/F 21 supplies various commands and data, which are supplied from the host apparatus, to the controller 22. Further, the host I/F 21 supplies various kinds of information, which is supplied from the controller 22, and various kinds of data, which is read from the optical disc 12, to the host apparatus.

The controller 22 controls the entire operations of the recording and reproducing apparatus 11. For example, the controller 22 is a controller including one controller chip for controlling the drive.

For example, the controller 22 supplies data, which is supplied from the host I/F 21, to the recording and reproducing processor 24-1 and the recording and reproducing processor 24-2. The controller 22 supplies data, which is supplied from the recording and reproducing processor 24-1 and the recording and reproducing processor 24-2, to the host I/F 21.

Further, for example, the controller 22 controls the recording and reproducing processor 24-1, the recording and reproducing processor 24-2, and the spindle motor 26 based on commands supplied from the host I/F 21, and records data such as user data in the optical disc 12 and reads data such as user data from the optical disc 12.

The controller 22 includes the manager 41 and the alternating processing unit 42.

The manager 41 manages the areas of the optical disc 12. For example, the manager 41 generates the above-mentioned DMS, and informs the host apparatus via the host I/F 21 of areas that can record user data and the like based on read DMS. Further, the alternating processing unit 42 performs the alternating processing when user data areas, DMA areas, and DMA mirror areas of the optical disc 12 have defects and data cannot be recorded.

The memory 23 sends/receives various data to/from the controller 22, and functions as a work area for the controller 22. For example, data, which is supplied from the host apparatus and is to be recorded in the optical disc 12, is recorded in the memory 23 temporarily.

Controlled by the controller 22, the recording and reproducing processor 24-1 and the recording and reproducing processor 24-2 perform signal processing and servo operations to record and reproduce data.

For example, the recording and reproducing processor 24-1 supplies data, which is supplied from the controller 22, to the optical pickup 25-1, and records the data in the optical disc 12. The recording and reproducing processor 24-2 supplies data, which is supplied from the controller 22, to the optical pickup 25-2, and records the data in the optical disc 12. Further, for example, the recording and reproducing processor 24-1 supplies data, which is read from the optical disc 12 and supplied from the optical pickup 25-1, to the controller 22. The recording and reproducing processor 24-2 supplies data, which is read from the optical disc 12 and supplied from the optical pickup 25-2, to the controller 22.

Note that, hereinafter, the recording and reproducing processor 24-1 and the recording and reproducing processor 24-2 may be simply referred to as the recording and reproducing processor(s) 24, when it is not particularly necessary to distinguish between the recording and reproducing processor 24-1 and the recording and reproducing processor 24-2.

Controlled by the recording and reproducing processors 24, the optical pickup 25-1 and the optical pickup 25-2 irradiate the optical disc 12 with laser light depending on data supplied from the recording and reproducing processors 24, and record data in the optical disc 12. Further, controlled by the recording and reproducing processors 24, the optical pickup 25-1 and the optical pickup 25-2 irradiate the optical disc 12 with laser light, and receive reflected light of the laser light at the same time. The optical pickup 25-1 and the optical pickup 25-2 supply data obtained based on the received light to the recording and reproducing processors 24 as read data.

Note that, hereinafter, the optical pickup 25-1 and the optical pickup 25-2 may be simply referred to as the optical pickup(s) 25, when it is not particularly necessary to distinguish between the optical pickup 25-1 and the optical pickup 25-2.

Further, for example, the optical pickup 25-1 records and reproduces data in the above-mentioned DS1 surface of the optical disc 12, and the optical pickup 25-2 records and reproduces data in the above-mentioned DS0 surface of the optical disc 12.

Controlled by the controller 22, the spindle motor 26 rotates the spindle, and thereby rotates the optical disc 12 mounted on the spindle.

<The Present Technology>
(Multiplexing of Management Information)

Next, the present technology will be described.

Figure 15:
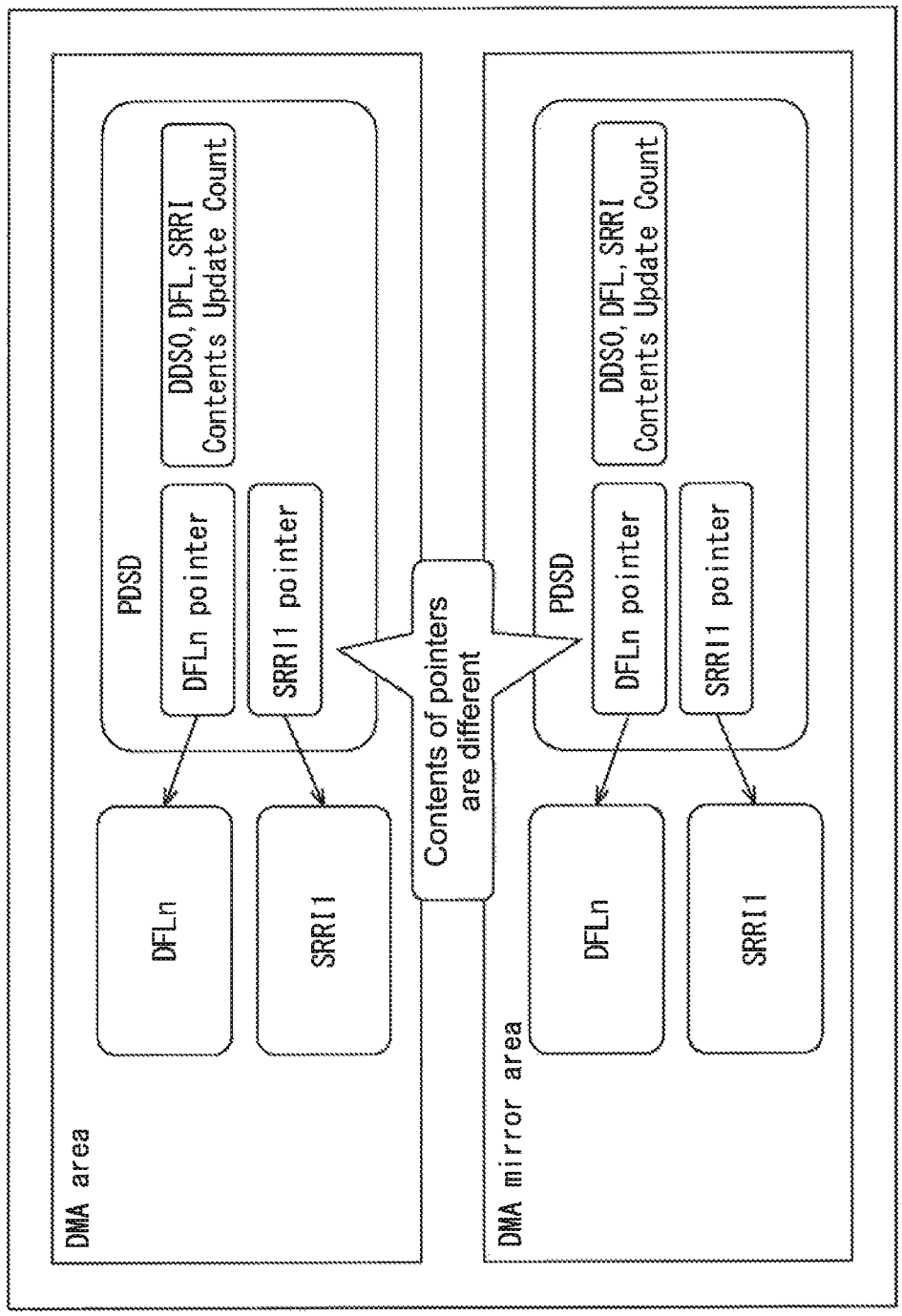
FIG. 15 A diagram illustrating how to duplex DMS.

The manager 41 records DMS as management information in areas of the optical disc 12. Specifically, as shown in FIG. 15, the manager 41 records the same DMS in a DMA area and a DMA mirror area as management areas.

In this example, PDSD, SRRI1, and DFLn as DMS are recorded in a DMA area. PDSD, SRRI1, and DFLn as DMS are recorded in a DMA mirror area. In this case, SRRI1 and DFLn in the DMA area are the same as SRRI1 and DFLn in the DMA mirror area.

To the contrary, First SPSN of DS0/DS1 SRRI1, which is a pointer of SRRI1 of P&C of PDSD, of the DMA area is different from First SPSN of DS0/DS1 SRRI1 of the DMA mirror area. First SPSN of DS0/DS1 DFL n (where n=1, . . . , 16), which is a pointer of DFLn of P&C of PDSD, of the DMA area is different from First SPSN of DS0/DS1DFL n (where n=1, . . . , 16) of the DMA mirror area. This is because, as described above, surface information is added to location information denoted by each pointer, and SPSN is generated.

Note that DDS0 contents update count, i.e., a DDS0update counter, of the DMA area is the same as DDS0contents update count, i.e., a DDS0 update counter, of the DMA mirror area. DFL contents update count, i.e., a DFL update counter, of the DMA area is the same as DFL contents update count, i.e., a DFL update counter, of the DMA mirror area. SRRI contents update count, i.e., an SRRI update counter, of the DMA area is the same as SRRI contents update count, i.e., an SRRI update counter, of the DMA mirror area. This is because, as described above, those update counters are not counted up (incremented) when rewriting DMS (PDSD).

Figure 16:
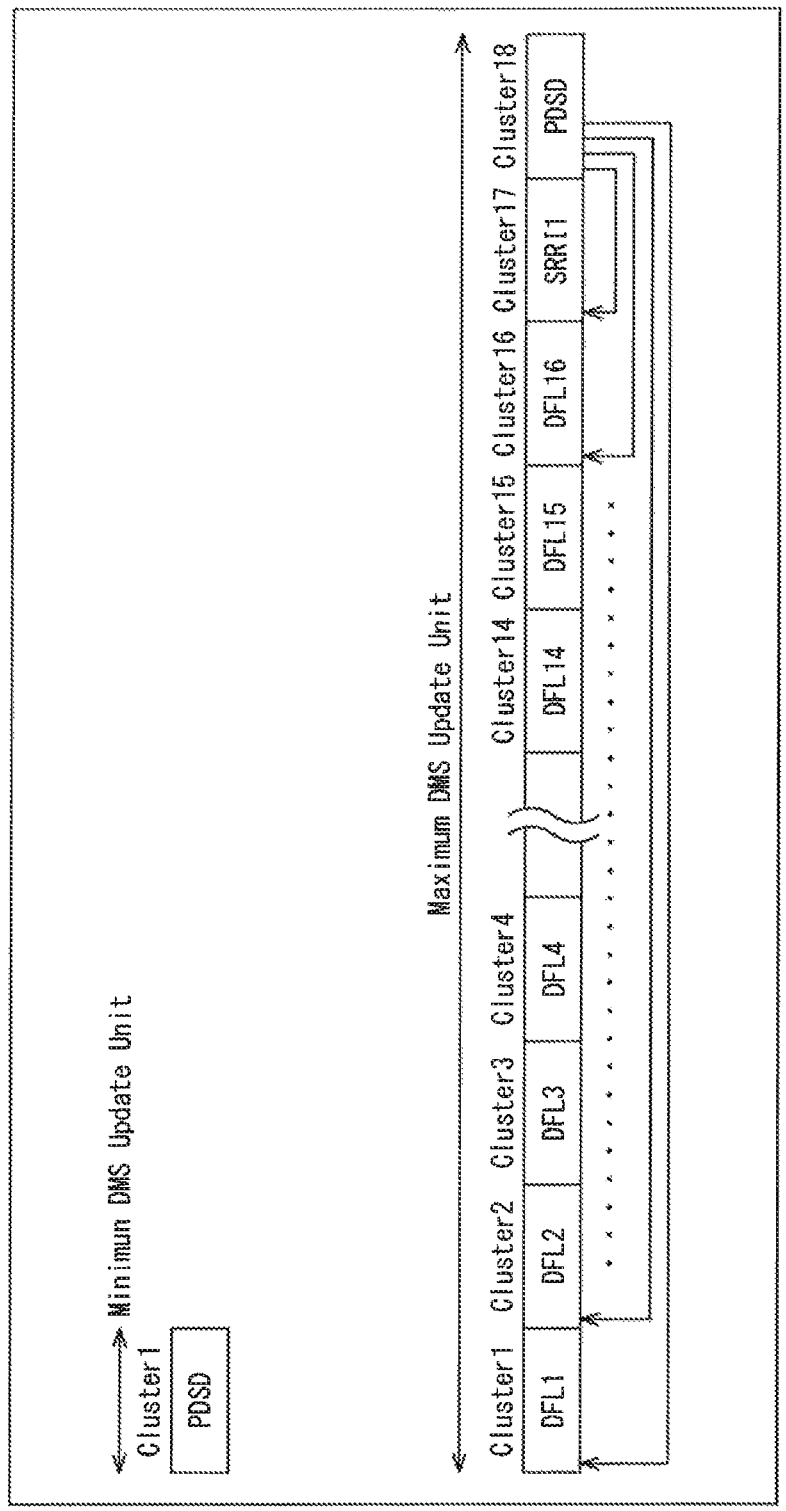
FIG. 16 A diagram illustrating how to record DMS.

Further, when recording DMS, as shown in the upper side of FIG. 16, the recording data volume of DMS is minimum when only PDSD is recorded.

For example, when SRRI and DFL are not extended and it is not necessary to prepare SRRI1 and DFLn, only PDSD is recorded as DMS.

Further, for example, only PDSD is recorded also when SRRI or DFL is extended, SRRI1 or DFLn is recorded already, it is not necessary to update SRRI1 and DFLn to record DMS, and only the content of PDSD is to be updated. Note that, in this case, the SRRI1 pointer of PDSD is the pointer indicating the last recorded SRRI1, and the DFLn pointer of PDSD is the pointer indicating the last recorded DFLn. Information including the last recorded SRRI1 or DFLn and PDSD newly recorded this time is newest DMS.

To the contrary, when recording DMS, as shown in the lower side of FIG. 16, the recording data volume of DMS is maximum when PDSD, SRRI1, and DFL1 to DFL16 are recorded as DMS.

In this example, PDSD contains a pointer indicating SRRI1 recorded simultaneously with the PDSD, and pointers indicating DFL1 to DFL16 recorded simultaneously with the PDSD.

Meanwhile, if management information such as DMS is recorded in only one area of an optical disc as described above, newest management information cannot be read from the optical disc when this area has defects. Then, it is not possible to record data in the optical disc, and, in addition, to access data recorded in the optical disc.

In view of this, the manager 41 records DMS as management information in a plurality of areas of the optical disc 12. Specifically, as shown in FIG. 15, the manager 41 records the same DMS, more specifically, DMSs whose pointer information is only different from one another, in a DMA area and a DMA mirror area.

Since DMS is multiplexed, even if DMS cannot be read from any area, it is possible to read DMS from the remaining area, and the newest management information can be obtained more reliably. As a result, it is possible to increase reliability of the optical disc 12 against defects.

In particular, the recording and reproducing apparatus 11 records DMS in independent areas of the different surfaces, i.e., a DMA area of the DS0 surface and a DMA mirror area of the DS1 surface of the optical disc 12. As a result, it is possible to further increase reliability. Further, the recording and reproducing apparatus 11 multiplexes DMS in a DMA area and a DMA mirror area before finalizing the optical disc 12, i.e., when the optical disc 12 is recordable. So it is possible to secure reliability irrespective of the status of the optical disc 12.

(How to Determine Newest Management Information)

Further, in multiplexing management information such as DMS, if DMS contains information showing itself (location of information in DMS) as pointer information of DMS, for example, even if a DMA area has defects and DMS is to be rewritten in another location of a DMA area, pointer information is changed and a counter, which shows the number of times of updating DMS content, is incremented.

In this case, if DMS is recorded in a DMA mirror area correctly, the counter value of DMS rewritten in a DMA area is different from the counter value of DMS recorded in a DMA mirror area. It is difficult to tell which DMS is the newest.

To the contrary, the manager 41 generates PDSD, i.e., basic management information, having a configuration in which PDSD contains no pointer information showing itself (location of information in PDSD). Pointer information contained in PDSD indicates external extended management information. Further, the manager 41 increments each counter of PDSD only when content of DMS is changed.

In other words, DDS0 contents update count, DFL contents update count, and SRRI contents update count, i.e., update counters each showing update number of times of each kind of information of DMS, are not updated (incremented) when the information is not updated. As a result, with regard to DMS of the same content recorded in a DMA area and a DMA mirror area, the update counter of DMS recorded in the DMA area is certainly consistent with the update counter of DMS recorded in the DMA mirror area, and consistency is ensured.

As described above, by managing pointer information and update counters in PDSD collectively, it is possible not only to manage them easily but also to ensure consistency of multiplexed DMS and to confirm the newest DMS easily.

For example, let's say that DMS contains PDSD and SRRI1, and only updated PDSD is recorded in a DMA area and a DMA mirror area because content of SRRI1 is not updated. In this case, new PDSD is based on the already-recorded SRRI1.

Let's say that, at this time, PDSD is recorded in a DMA mirror area correctly, and PDSD is not correctly recorded in a DMA area because of writing errors or the like.

In this case, the manager 41 controls the recording and reproducing processor 24 to rewrite record-failed PDSD in a new location of the DMA area. In this case, the content of PDSD is not changed because PDSD does not contain pointer information indicating itself. Specifically, because pointer information indicating SRRI1 is not changed and DDS0 and SRRI are not changed, their update counters are not incremented, either.

So the manager 41 does not need to generate new PDSD, and only needs to rewrite the record-failed PDSD as it is in a DMA area. In addition, in this case, the update counter values of DDS0, DFL, and SRRI of DMS recorded in a DMA area are the same as the update counter values of DDS0, DFL, and SRRI of DMS recorded in a DMA mirror area. As a result, it is possible to ensure consistency between DMS recorded in the DMA area and DMS recorded in the DMA mirror area, and to determine the newest DMS easily.

Note that, even if SRRI1 and DFLn as DMS are recorded together with PDSD, when the manager 41 firstly records SRRI1 and DFLn and records PDSD after SRRI1 and DFLn are recorded correctly, it is not necessary to change content of PDSD in rewriting even if recording of PDSD is failed. So it is possible to ensure consistency.

Further, when the manager 41 reads DMS from a DMA area and DMS from a DMA mirror area, the manager 41 compares the update counter values of DMS read from the DMA area with the update counter values of DMS read from the DMA mirror area. As a result, it is possible to ensure consistency.

In short, the maximum update counter value of DMS recorded in a DMA area is the newest DMS recorded in the DMA area, and the maximum update counter value of DMS recorded in a DMA mirror area is the newest DMS recorded in the DMA mirror area. Further, when the update counter value of the newest DMS in a DMA area is consistent with the update counter value of the newest DMS in a DMA mirror area, both the DMSs are the newest. When the update counter value of the newest DMS in a DMA area is inconsistent with the update counter value of the newest DMS in a DMA mirror area, DMS containing the update counter having the larger value is the newest.

(Reduction of Consumption of Areas in which Management Information is Recorded)

Further, as described above, when the manager 41 records DMS, DMS contains PDSD as basic management information, and in addition, SRRI1 and DFLn as extended management information. As a result, it is possible to reduce consumption of management areas such as DMA areas and DMA mirror areas. Further, it is possible to increase user data areas as the consumption of the management areas is reduced.

For example, when the optical disc 12 has new SRRs or when user data is recorded in existing SRRs, it is necessary to add or update an SRR entry. In this case, typically, as shown by the arrow Q41 of FIG. 17, the manager 41 adds a new SRR entry in SRRI0 of PDSD, or updates an SRR entry of SRRI0.

As described above, when SRRI is not extended, i.e., when DMS does not contain SRRI1 as a configuration element, SRRI0 contains an SRR entry of open-status SRR and an SRR entry of closed-status SRR. In short, SRRI0 contains an open SRR entry and a closed SRR entry.

Let's say that SRR entries are increased from that status, and SRR entry cannot be recorded in SRRI0 anymore.

In this case, the manager 41 generates DMS containing PDSD and SRRI1 as shown by the arrow Q42, and records DMS in a DMA area and a DMA mirror area. For example, when a new SRR entry is to be added in SRRI0 and an SRR entry cannot be recorded in SRRI0 anymore, SRRI1 is generated.

Specifically, the manager 41 generates PDSD containing new SRRI0, which contains an open-status SRR entry among the SRR entries already contained in SRRI0 and one newly added SRR entry, and generates SRRI1, which contains a closed SRR entry among the SRR entries already contained in SRRI0.

Further, in this case, the manager 41 sorts the SRR entries where the 64-bit data of the entire SRR entries is treated as a 64-bit integer value, and stores the SRR entries in SRRI0. Similarly, the manager 41 sorts the SRR entries stored in SRRI1, and then stores the SRR entries in SRRI1 in the sorted order. As a result, the SRR entries contained in SRRI0 and SRRI1 are arrayed in the order of SPSN, i.e., in the order of LSN.

When DMS is to be recorded in a DMA area and a DMA mirror area next time where SRRI1 is provided as an extended area for SRRI, and when the content of SRRI1 is not updated, the manager 41 only needs to generate and record only new PDSD. In this case, First SPSN of DS0/DS1 SRRI1 of P&C of newly recorded PDSD is pointer information showing the location of already-recorded SRRI1.

Information containing newly recorded PDSD and already-recorded SRRI1 is the newest DMS.

Typically, open SRR is accessed when recording user data, and an SRR entry of closed SRR is not changed. So, in most cases, it is only necessary to record PDSD even after extending SRRI. As described above, in addition to PDSD as basic management information, SRRI1 as extended management information is provided. As a result, it is possible to reduce consumption of DMA areas and DMA mirror areas.

Figure 18:
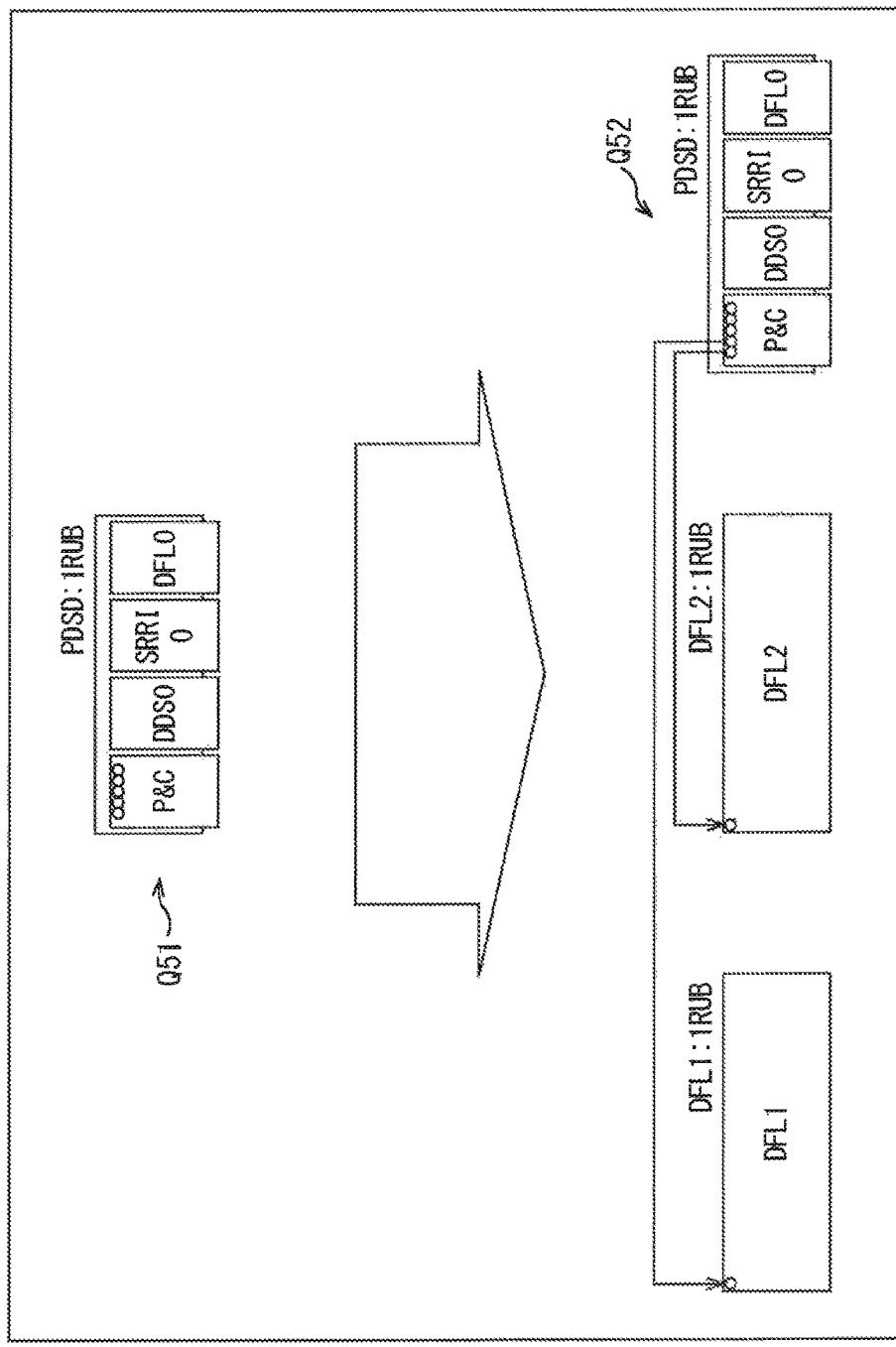
FIG. 18 A diagram illustrating how to extend DFL.

Further, for example, when the alternating processing is performed in recording user data and it is necessary to add a DFL entry, typically, as shown by the arrow Q51 of FIG. 18, the manager 41 adds a new DFL entry in DFL0 of PDSD.

As described above, when DFL is not extended, i.e., when DMS does not contain DFLn as a configuration element, DFL0 contains all the DFL entries. In this status, sorted DFL entries are stored in DFL0 without redundancy.

Let's say that DFL entries are increased from that status, and DFL entry cannot be recorded in DFL0 anymore.

In this case, the manager 41 generates DMS containing PDSD and DFL1, and records DMS in a DMA area and a DMA mirror area. In other words, the manager 41 generates PDSD and DFL1, where DFL1 contains all the DFL entries stored in DFL0 until now, and where new DFL0 contains no DFL entry, i.e., new DFL0 is void.

Further, when the manager 41 newly generates DFL entries, the manager 41 stores the DFL entries in DFL0. When the DFL entries in DFL0 is increased and DFL entry cannot be recorded in DFL0 anymore, DFL entries stored in DFL0 are flushed (moved) and are recorded in DFL1, DFL0 becomes void, and new DFL entries are recorded in DFL0.

Further, let's say that DFL entries cannot be recorded in DFL0 anymore after that, and some DFL entries cannot be recorded in DFL1 when DFL entries already recorded in DFL0 are to be recorded in DFL1. In this case, the manager 41 generates DMS containing PDSD, DFL1, and DFL2 denoted by the arrow Q52, and records DMS in a DMA area and a DMA mirror area.

For example, when new DFL entries are to be added in DFL and new DFL entries cannot be recorded in DFL0, new DFL1 and DFL2 are generated.

Specifically, the manager 41 sorts DFL entries already contained in DFL0 and DFL entries already contained in DFL1, stores the DFL entries in DFL1 and DFL2 arrayed in order, and handles newly generated DFL1 and DFL2.

Here, sort of DFL entries are similar to sort of SRR entries. DFL entries are arrayed in ascending order where the 64-bit data of the entire DFL entries is treated as a 64-bit integer value. As a result, a group of alternated defective DFL entries are arrayed in the order of alternate-origin SPSN after a group of unalternated defective DFL entries.

Further, in this case, let's say that existing DFL1 contains a DFL entry whose alternate-origin is A and alternate-destination is B, and existing DFL0 contains a DFL entry whose alternate-origin is A and alternate-destination is C. In short, there are redundant DFL entries having the common alternate-origin. Such redundancy occurs when the alternating processing from A to C is generated where a DFL entry whose alternate-origin is A and alternate-destination is B is recorded in DFL1.

In this case, the manager 41 validates newer DFL entry, i.e., DFL entry contained in DFL0 whose alternate-origin is A and alternate-destination is C, and deletes DFL entry whose alternate-origin is A and alternate-destination is B. As a result, redundancy of DFL entries is canceled. When there are redundant DFL entries as described above, DFL entry of DFL0 has a priority because DFL entry stored in DFL0 is the newest, and DFL entry of the other DFLn is deleted.

Further, the manager 41 generates PDSD, which has DFL0 storing no DFL entry and in which information showing recording locations of newly generated DFL1 and DFL2, i.e., First SPSN of DS0/DS1 DFL1 and First SPSN of DS0/DS1 DFL2 contained in P&C of PDSD, is described. Note that newly added DFL entry may be recorded in void DFL0, or may be recorded in DFL1 or DFL2.

After the manager 41 records the newly generated DFL1 and DFL2 in a DMA area and a DMA mirror area, the manager 41 records newly generated PDSD in a DMA area and a DMA mirror area, and treats information containing PDSD, DFL1, and DFL2 as new DMS.

Because DFLn is provided as an extended area for DFL, when it is necessary to add DFL entries after that and DMS is to be recorded in a DMA area and a DMA mirror area, the manager 41 only needs to generate new PDSD and to record DMS as long as DFL0 can store DFL entries. In other words, it is only necessary to describe information showing the location of already-recorded DFLn as pointer information of newly generated PDSD.

In this case, only when DFL0 cannot store DFL entries anymore, DFLn is newly generated and DFL entries are recorded in DFLn. It is very rare that DFL entries cannot be recorded in DFL0 anymore. So, typically, it is only necessary to record PDSD.

As described above, in addition to PDSD as basic management information, DFLn as extended management information is provided. As a result, it is possible to reduce consumption of DMA areas and DMA mirror areas.

When the recording and reproducing apparatus 11 employs the method of extending DFL, as described above, in some cases, the alternate-origin contained in DFL entry of DFL0 is the same as the alternate-origin contained in DFL entry of DFLn. In short, in some cases, there are redundant DFL entries of DFL0 and DFLn.

However, the manager 41 of the recording and reproducing apparatus 11 gives more priority to DFL entry of DFL0 than DFL entry of DFLn. So redundancy of DFL entries causes no inconvenience. In addition, because redundancy of DFL entries of DFL0 and DFLn is acceptable in the recording and reproducing apparatus 11, when DFL entries can be recorded in DFL0 when updating DMS, it is only necessary to update DFL0 even if there are redundant DFL entries.

For example, let's say that, as described above, DFL1 contains DFL entry whose alternate-origin is A and alternate-destination is B, and DFL0 contains DFL entry whose alternate-origin is A (area A) and alternate-destination is C (area C). In this case, when a host apparatus instructs to access the area A, the manager 41 gives more priority to DFL entry of DFL0, specifies the area C, i.e., the actual (newest) alternate-destination for the area A, and instructs the recording and reproducing processor 24 to access (read/write data from/in) the area C.

Further, as described above with reference to FIG. 11, an entry having unalternated continuous defects can be registered as DFL entry in the optical disc 12.

For example, in a BD or the like, although unalternated defects can be registered as TDFL, it is necessary to register continuous blocks (defects) individually because there is no method of showing continuous blocks (continuous defects). Then the number of TDFL entries recorded in TDMS may be larger, and as a result, TDMS may have a larger volume.

To the contrary, in the optical disc 12, an unalternated single defect and unalternated continuous defects are registered where the unalternated single defect is distinguished from the unalternated continuous defects. In other words, unalternated continuous defects (NRCD defects) can be registered in two (a pair of) DFL entries. So it is possible to reduce the size of DMS and consumption of DMA areas and DMA mirror areas.

For example, when defects are detected in a user data area or the like when certifying a disc such as shipping inspection of the optical disc 12, a controller of an inspection drive generates DFL entry of the detected defects, which is sorted into NRSD or NRCD, and records PDSD containing the DFL entry in a DMA area and a DMA mirror area. As described above, a single defect and continuous defects may be preregistered in DFL, and then the optical disc 12 may be shipped.

Before the manager 41 of the recording and reproducing apparatus 11 reads/writes data from/in the optical disc 12, the manager 41 reads preregistered defective DFL entry and gets information about a defective area. Then, when reading/writing data actually, the manager 41 controls the recording and reproducing processor 24 not to access the registered defective area, whose information is obtained preliminarily, i.e., not to use (not to record/reproduce data in/from) the defective area.

As described above, since defects are preregistered in a DFL entry and a registered defective area is not used, it is not necessary to perform unnecessary recording/reproducing processing, recording confirmation processing, and the like. As a result, it is possible to record/reproduce data faster. Particularly, it is possible to further reduce probability of finding unknown defects when recording data, and to record data much faster.

(Finalization of Optical Disc)

Further, when SRRI and DFL are extended in the optical disc 12, SRR entries and DFL entries are recorded in not only SRRI0 and DFL0 but also SRRI1 and DFLn. If such an optical disc 12 as it is finalized, every time user data is read from the optical disc 12 after that, it is necessary to read SRR entries and DFL entries from not only SRRI0 and DFL0 but also SRRI1 and DFLn and to sort those entries. Such processing takes a lot of time. In short, it takes a lot of time to mount. Note that, here, finalization of the optical disc 12 means to establish the status in which data cannot be recorded in the optical disc 12 anymore, i.e., the status in which data can only be read from the optical disc 12.

In view of this, when finalizing the optical disc 12, the recording and reproducing apparatus 11 records SRR entries in one location and DFL entries in one location. As a result, it is easier to handle those entries after finalization.

Figure 19:
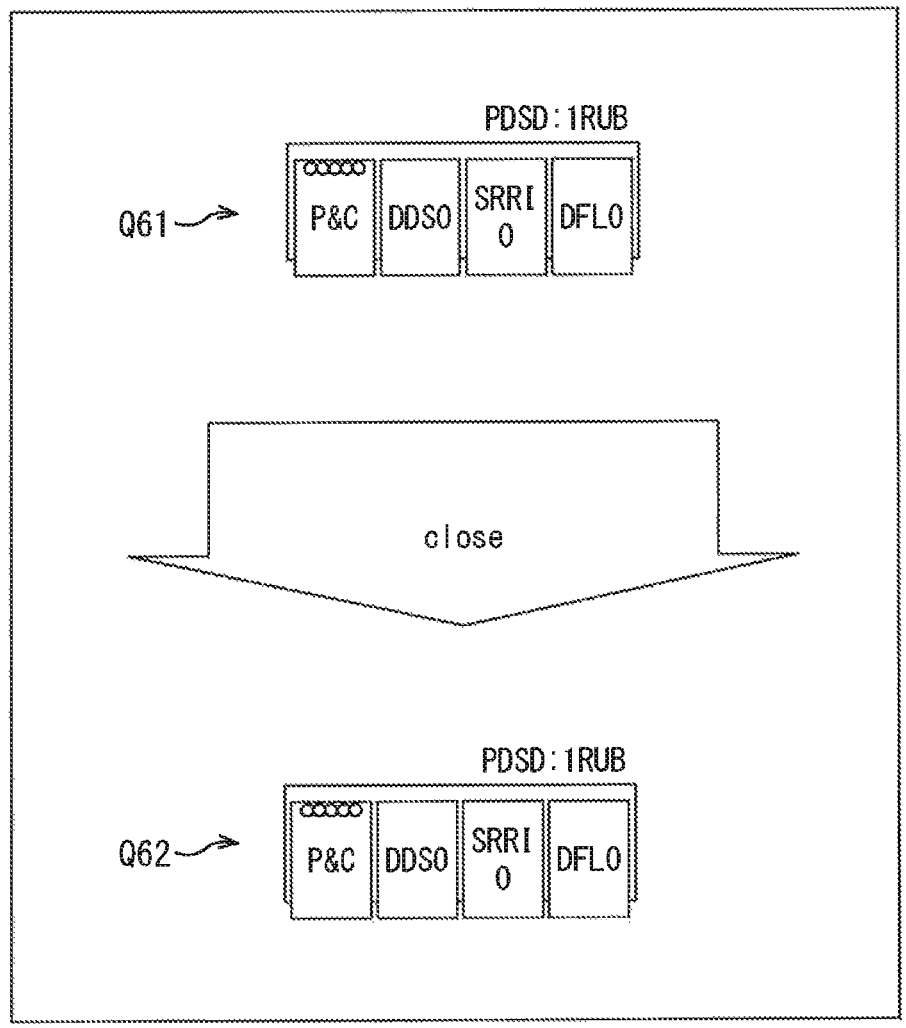
FIG. 19 A diagram illustrating how to finalize the optical disc.

For example, as shown by the arrow Q61 of FIG. 19, let's say that SRRI is not extended and DMS only contains PDSD as a configuration element. In this case, SRR entries of open or closed SRR are sorted and recorded in SRRI0.

Then, when the manager 41 receives an instruction to finalize the optical disc 12, the manager 41 closes all the sessions and SRRs, and generates, as DMS, PDSD that contains SRRI0 containing all the closed SRR entries, which are sorted, as shown by the arrow Q62. Then the manager 41 supplies the generated DMS to the recording and reproducing processor 24, and records the generated DMS in a DMA area and a DMA mirror area. Further, the similar DMS is recorded in a DMA anchor area, and the optical disc 12 is thus finalized (closed).

Figure 20:
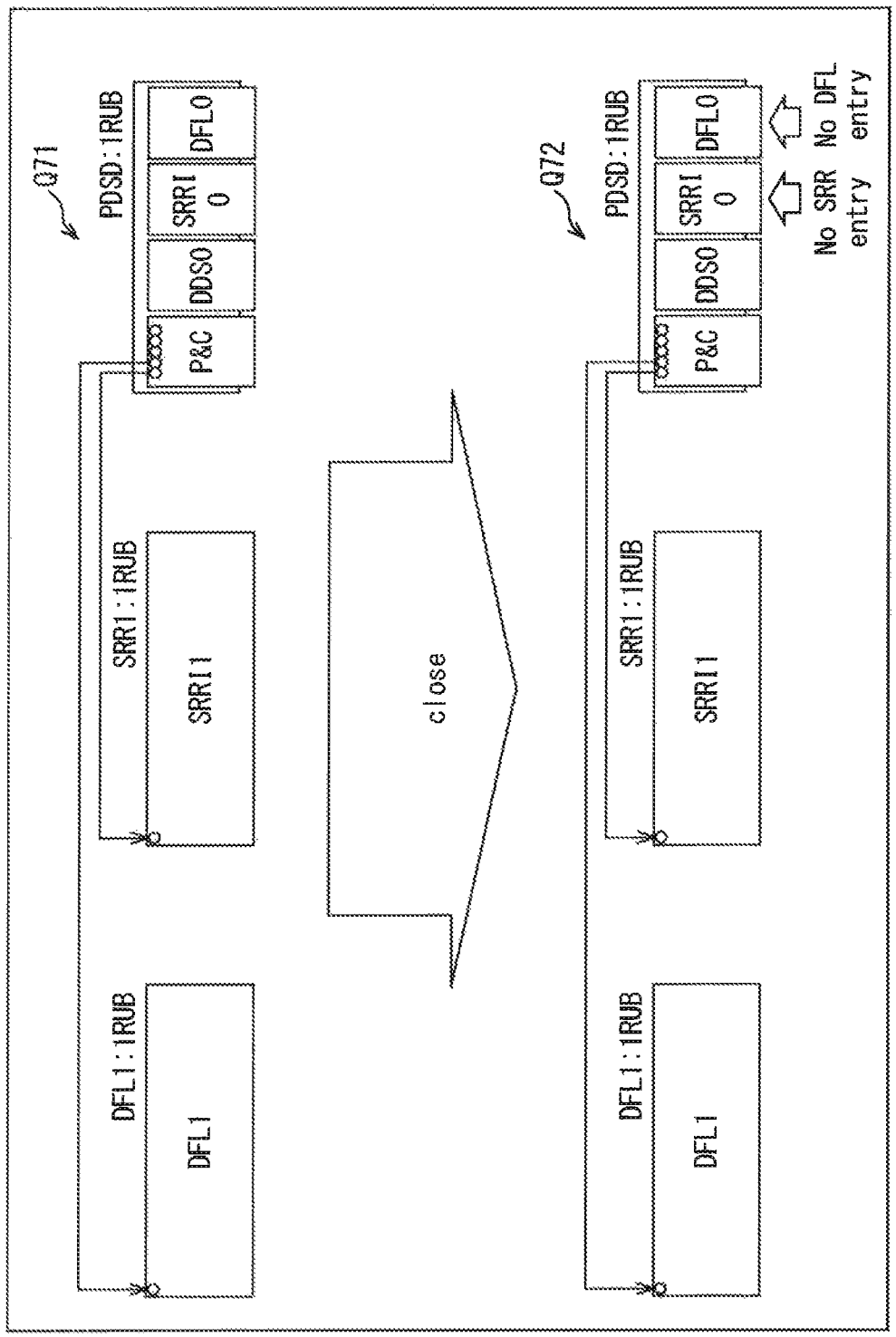
FIG. 20 A diagram illustrating how to finalize the optical disc.

To the contrary, for example, let's say that, as shown by the arrow Q71 of FIG. 20, SRRI and DFL are extended, and DMS contains PDSD, SRRI1, and DFL1 as configuration elements. Let's say that, in this case, SRR entries of open SRR are sorted and recorded in SRRI0. Further, closed SRR entries are sorted and recorded in SRRI1.

Then, when the manager 41 receives an instruction to finalize the optical disc 12, the manager 41 closes all the sessions and SRRs, and generates SRRI1 containing all the closed SRR entries, which are sorted, as shown by the arrow Q72. Further, the manager 41 generates DFL1 containing all the DFL entries, which are sorted, and, in addition, generates PDSD. In this case, SRRI0 of PDSD contains no SRR entry. The value of number of SRR entry on SRRI0 of FIG. 7 is 0. Similarly, DFL0 of PDSD contains no DFL entry.

The manager 41 supplies the thus-generated DMS containing PDSD, SRRI1, and DFL1 to the recording and reproducing processor 24 to record DMS in a DMA area and a DMA mirror area. Further, the similar DMS (Note that only PDSD) is recorded in a DMA anchor area, and the optical disc 12 is thus finalized.

As described above, when SRRI is extended, all the SRR entries are stored in SRRI1 and the disc is finalized. As a result, it is possible to easily manage SRR entries after finalization and it takes less time to mount.

Figure 21:
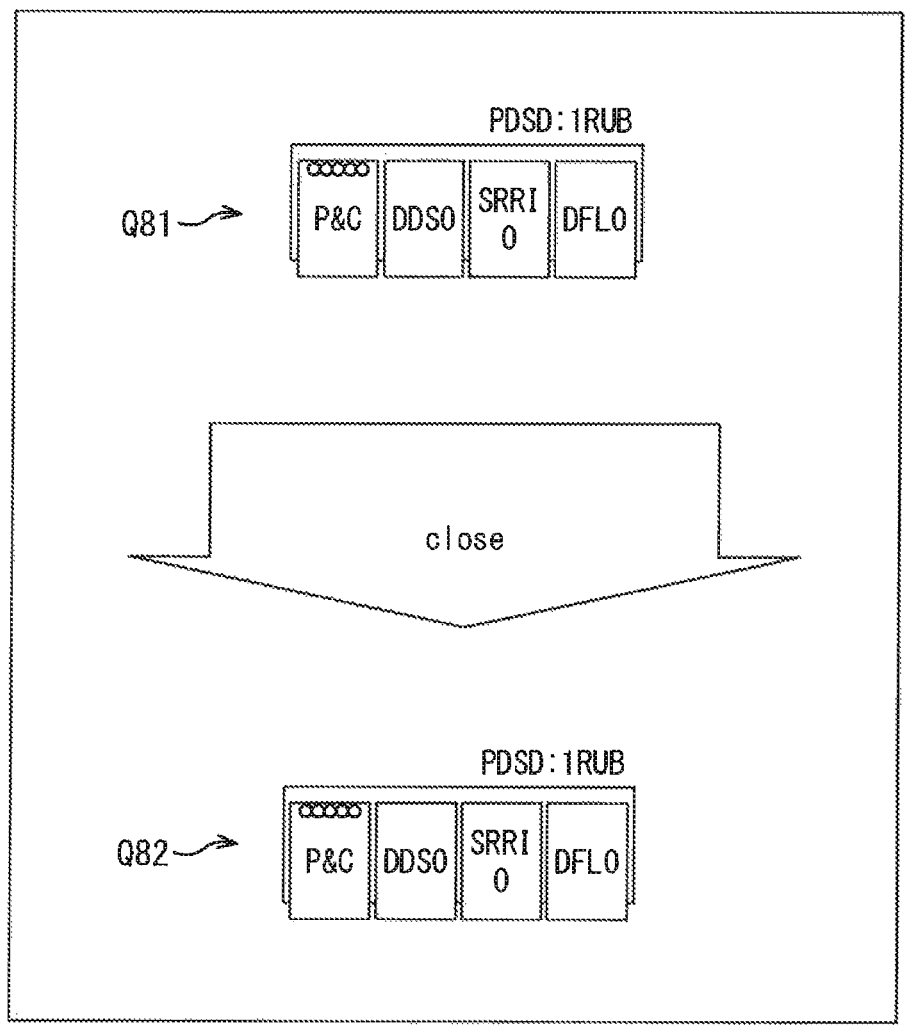
FIG. 21 A diagram illustrating how to finalize the optical disc.

Similarly, for example, let's say that, as shown by the arrow Q81 of FIG. 21, DFL is not extended and DMS only contains PDSD as a configuration element. In this case, DFL entries are sorted and recorded in DFL0 without redundancy.

Then, when the manager 41 receives an instruction to finalize the optical disc 12, the manager 41 generates, as shown by the arrow Q82, as DMS, PDSD containing DFL0 containing all the DFL entries, which are sorted without redundancy. Further, the manager 41 supplies the generated DMS to the recording and reproducing processor 24 to record the generated DMS in a DMA area and a DMA mirror area. Further, the similar DMS is recorded in a DMA anchor area, and the optical disc 12 is thus finalized.

Figure 22:
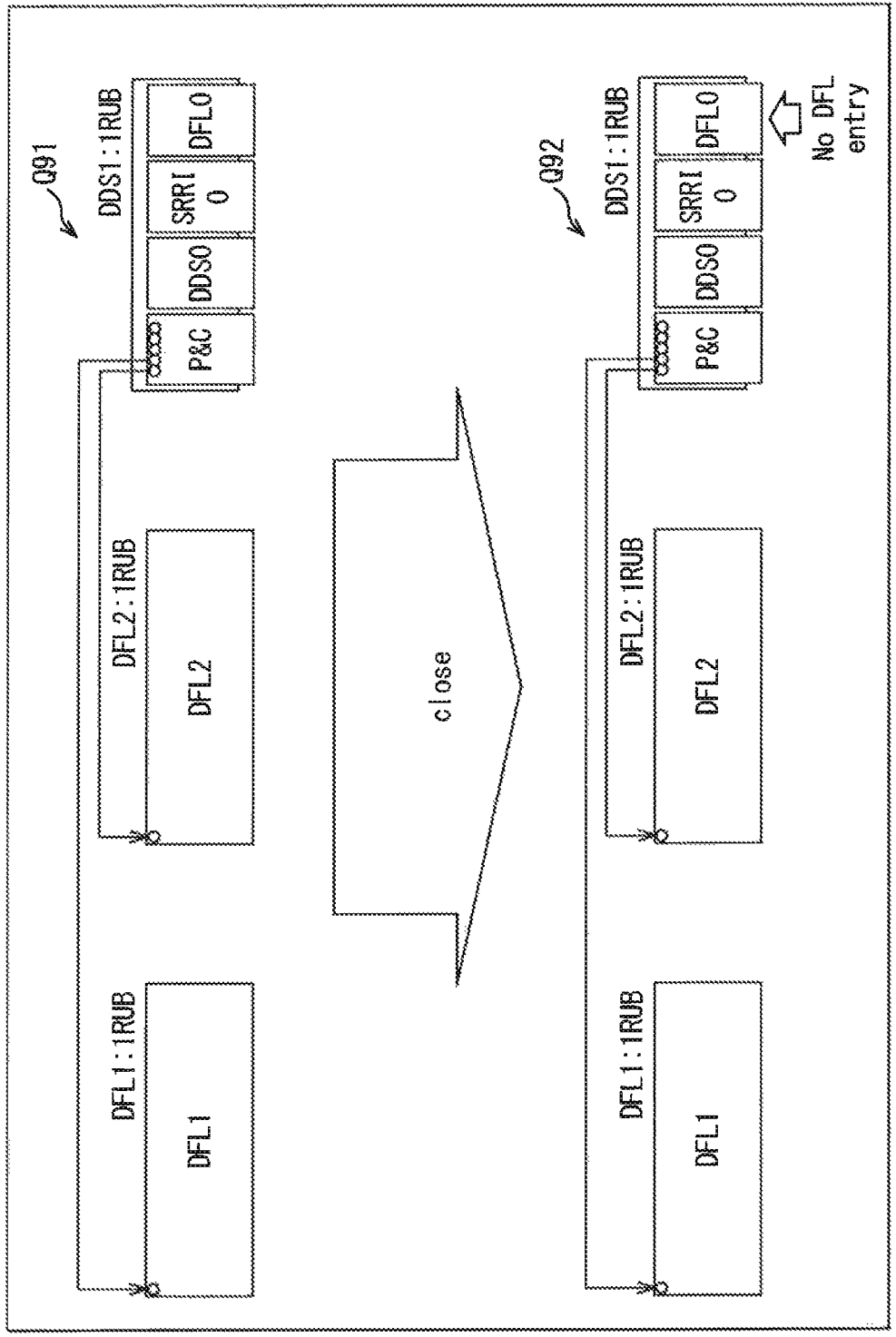
FIG. 22 A diagram illustrating how to finalize the optical disc.

To the contrary, for example, let's say that, as shown by the arrow Q91 of FIG. 22, DFL is extended, and DMS contains PDSD, DFL1, and DFL2 as configuration elements. In this case, DFL entries are sorted and recorded in DFL0 without redundancy. Further, DFL entries are sorted and recorded in DFL1 and DFL2 without redundancy. Note that the sorted DFL entries are recorded in DFL1, and the DFL entries, which cannot be recorded in DFL1 anymore, are recorded in DFL2 after that.

Then, when the manager 41 receives an instruction to finalize the optical disc 12, as shown by the arrow Q92, the manager 41 generates new DFL1 and DFL2 storing all the DFL entries already recorded in DFL0, DFL1, and DFL2, which are sorted without redundancy. In short, all the DFL entries are sorted and stored in DFL1 and DFL2 in order. In this case, as described above, when DFLn and DFL0 contain redundant DFL entries, i.e., DFL entries having the common alternate-origin, the DFL entry of DFL0 has a priority, and the DFL entry of DFLn is deleted.

Further, the manager 41 also generates PDSD, which contains DFL0 storing no DFL entry. The manager 41 supplies the thus-generated DMS containing PDSD, DFL1, and DFL2 to the recording and reproducing processor 24 to record DMS in a DMA area and a DMA mirror area. Further, the similar DMS (Note that only PDSD) is recorded in a DMA anchor area, and the optical disc 12 is thus finalized.

As described above, when DFL is extended, all the DFL entries are stored in DFLn and the disc is finalized. As a result, it is possible to easily manage DFL entries after finalization and it takes less time to mount.

(Use of Spare Areas)

Further, the recording and reproducing apparatus 11 employs a method of using spare areas more effectively.

Figure 23:
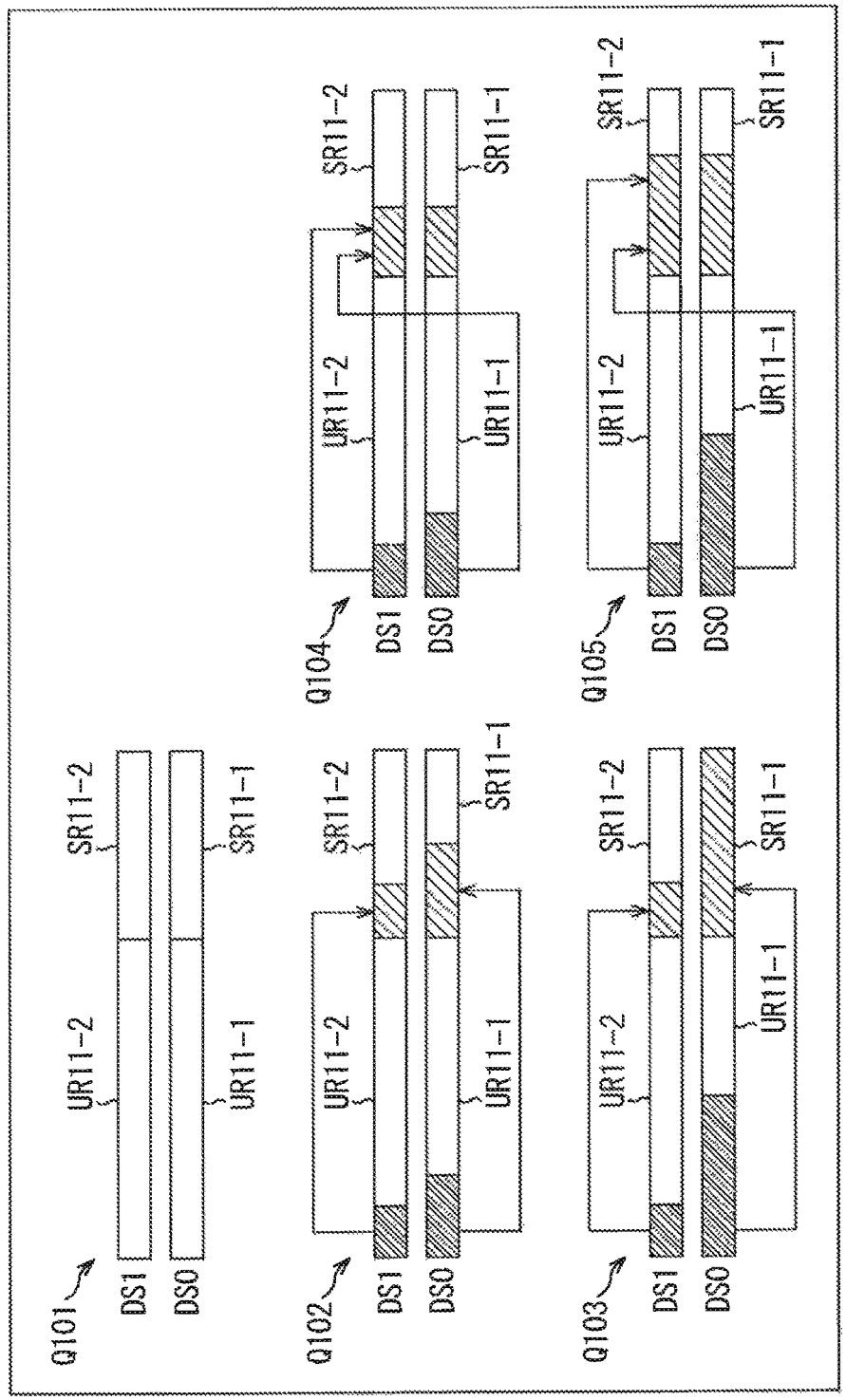
FIG. 23 A diagram illustrating how to finalize the optical disc.

For example, to make the description simple, let's say that the three user data areas of the DS0 surface of FIG. 1 are collectively treated as one user data area UR11-1 as shown by the arrow Q101 of FIG. 23, the six spare areas of the DS0 surface of FIG. 1 are collectively treated as one spare area SR11-1. Similarly, let's say that the three user data areas of the DS1 surface of FIG. 1 are collectively treated as one user data area UR11-2 as shown by the arrow Q101 of FIG. 23, the six spare areas of the DS1 surface of FIG. 1 are collectively treated as one spare area SRL1-2.

Note that, hereinafter, each user data area may be simply referred to as the user data area UR11, when it is not particularly necessary to distinguish between the user data area UR11-1 and the user data area UR11-2. Further, hereinafter, each spare area may be simply referred to as the spare area SR11, when it is not particularly necessary to distinguish between the spare area SR11-1 and the spare area SR11-2.

Let's say that, as shown by the arrow Q102, a defective area of the user data area UR11-1 of the DS0 surface is alternated only with the spare area SR11-1 of the DS0 surface, and a defective area of the user data area UR11-2 of the DS1 surface is alternated only with the spare area SR11-2 of the DS1 surface. Note that, in FIG. 23, the hatched area of the user data area UR11 or the spare area SR11 shows an area in which data is recorded.

As the result of the alternating processing, for example, let's say that, as shown by the arrow Q103, the spare area SR11-1 of the DS0 surface is full, and data cannot be recorded in the spare area SR11-1 anymore. In this example, because the number of defective areas of the user data area UR11-2 of the DS1 surface is smaller than the number of defective areas of the user data area UR11-1 of the DS0 surface, data can still be recorded in the spare area SR11-2.

However, because no data can be recorded in the spare area SR11-1 of the DS0 surface anymore, if a host apparatus does not distinguish between the DS0 surface and the DS1 surface, user data cannot be recorded in the user data area UR11 even if the spare area SR11-2 has a recordable area. In other words, data cannot be recorded in the optical disc 12 anymore. As described above, when spare areas of surfaces are managed individually and when one of the DS0 surface and the DS1 surface has more defects, the consumption status of the spare area of the DS0 surface is different from the consumption status of the spare area of the DS1 surface. As a result, the use efficiency of the recording range of the optical disc 12 is decreased.

In view of this, the manager 41 and the alternating processing unit 42 of the recording and reproducing apparatus 11 does not manage the spare areas of the surfaces individually, but collectively manage the spare areas of the DS0 surface and the DS1 surface, i.e., all the spare areas of both the surfaces.

Specifically, as shown by the arrow Q104, the alternating processing unit 42 uses the spare area SR 11-1 and the spare area SR 11-2 as alternate-destinations of both the areas, i.e., the user data area UR 11-1 and the user data area UR11-2. In this example, the spare area SR 11-2 is used as the alternate-destination of the user data area UR 11-1 and the alternate-destination of the user data area UR11-2.

For example, the alternating processing unit 42 uses the less-recorded area, i.e., the spare area SR11 having a larger recordable area, as an alternate-destination area. As a result, both the surfaces are used equally. Further, the two spare areas SR11 may be used alternately.

As described above, by managing the spare areas of both the surfaces, even if the number of defective areas of the DS0 surface is different from the number of defective areas of the DS1 surface, for example, as shown by the arrow Q105, user data can be recorded until data cannot be recorded in both the spare area SR 11-1 and the spare area SR 11-2 anymore. In short, it is possible to use the spare areas more effectively. In this example, it is understood that the spare areas SR11 are used equally.

(Surface Information)

Figure 24:
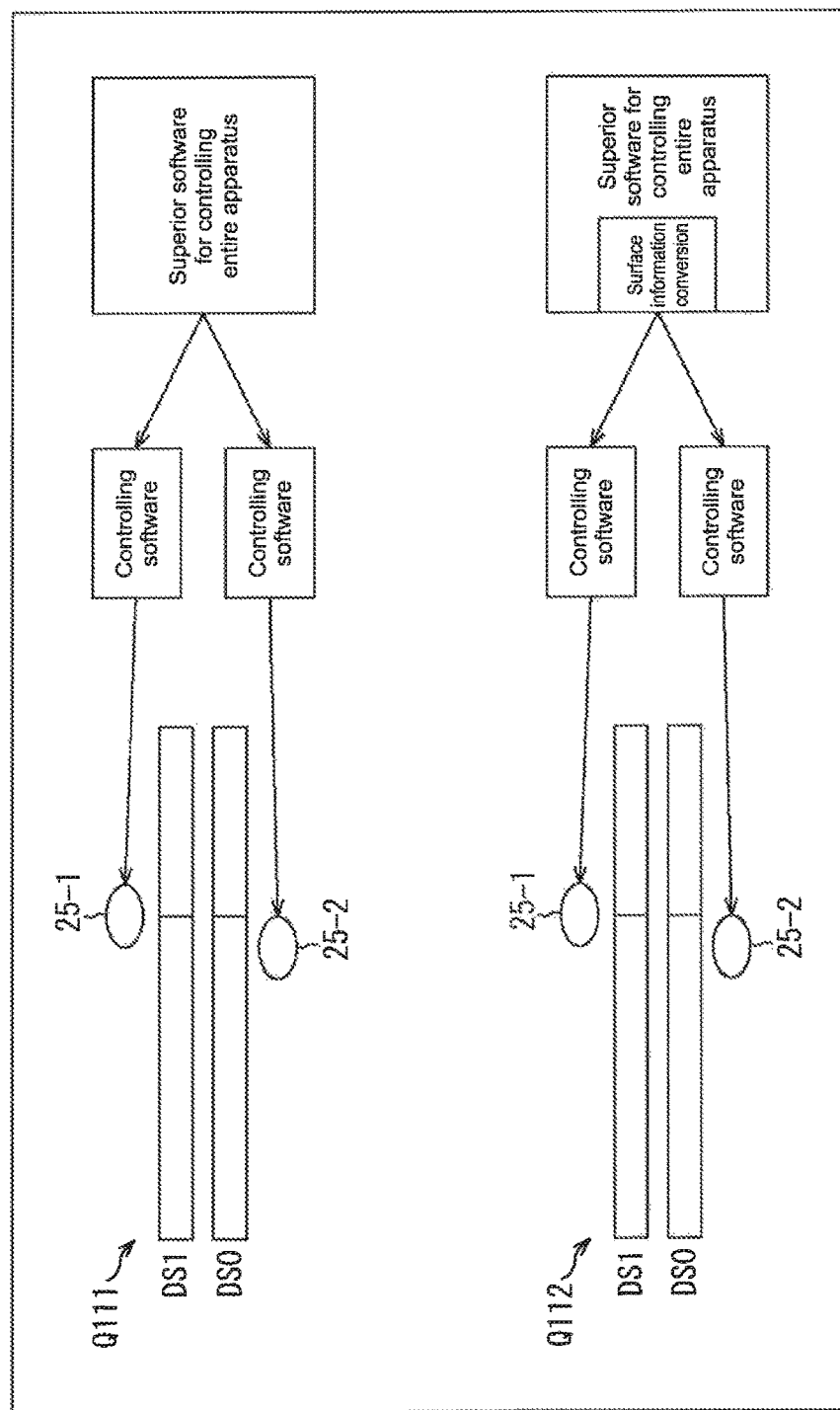
FIG. 24 A diagram illustrating how to finalize the optical disc.

Meanwhile, for example, let's say that, as shown by the arrow Q111 of FIG. 24, the optical pickup 25-1 accesses (records/reproduces data in/from) the DS1 surface, and, at the same time, the optical pickup 25-2 accesses the DS0 surface. In this case, software that controls the entire recording and reproducing apparatus 11 instructs software that controls the optical pickup 25-1 to record and reproduce data, and the software that controls the entire recording and reproducing apparatus 11 instructs software that controls the optical pickup 25-2 to record and reproduce data.

In this case, if independent PSNs (physical addresses) are assigned to the DS0 surface and the DS1 surface, it is necessary to prepare different kinds of software as the software that controls the optical pickup 25-1 and the software that controls the optical pickup 25-2. As a result, it is complicated to manage the software.

In view of this, as described above, the common PSN is assigned to the DS0 surface and the DS1 surface of the optical disc 12. In other words, the common PSN is recorded in the DS0 surface and the DS1 surface of the optical disc 12 as wobble information of those surfaces.

As a result, as shown by the arrow Q112, the superior software that controls the entire recording and reproducing apparatus 11 realizes a block for distinguishing the DS0 surface and the DS1 surface, i.e., a block for converting surface information, by using a virtual address, which is obtained by adding surface information to PSN. Further, the superior software instructs the software that controls the optical pickup 25-1 and the software that controls the optical pickup 25-2 to record and reproduce data.

Here, the software that controls the optical pickup 25-1 corresponds to a program that the recording and reproducing processor 24-1 reads from a memory (not shown) and executes to realize various functions. Similarly, the software that controls the optical pickup 25-2 corresponds to a program that the recording and reproducing processor 24-2 reads from a memory (not shown) and executes to realize various functions.

Further, the superior software that controls the recording and reproducing apparatus 11 corresponds to a program that the controller 22 reads from a memory (not shown) and executes to realize various functions. By executing the program, a block for converting surface information is also realized.

As described above, the recording and reproducing apparatus 11 controls the optical disc 12 based on a virtual address containing surface information, i.e., SPSN, only when the manager 41 and the alternating processing unit 42 control the management of the areas of the optical disc 12 and the alternating processing. As a result, the software that controls the optical pickup 25-1 can be the same as the software that controls the optical pickup 25-2. It is easy to manage the control software. Further, actual address information of the optical disc 12 can be reduced by 1 bit, i.e., the size of surface information.

<Description of Data Recording Processing>

Next, the operation of the recording and reproducing apparatus 11 will be described.

First, with reference to the flowchart of FIG. 25, data recording processing by the recording and reproducing apparatus 11 will be described. The data recording processing is started when the optical disc 12 is injected (inserted) into the recording and reproducing apparatus 11 and an instruction to record 1-RUB user data is input.

In Step S11, the controller 22 reads DMS from a DMA anchor area of the optical disc 12.

In other words, the controller 22 instructs the recording and reproducing processor 24 to read DMS. The recording and reproducing processor 24 controls the optical pickup 25 based on the instruction from the controller 22, and reads DMS from a DMA anchor area of the optical disc 12.

Controlled by the recording and reproducing processor 24, the optical pickup 25 irradiates the optical disc 12 with laser light, receives reflected light (laser light) from the optical disc 12, obtains (reads) DMS based on photoelectric conversion, and supplies DMS to the controller 22 via the recording and reproducing processor 24.

Further, based on DMA Flag and DMA-Mirror Flag contained in P&C of the read newest DMS, the manager 41 determines if DMA areas and DMA mirror areas have troubles or not and confirms fragmentation information of the DMA areas and the DMA mirror areas.

For example, fragmentation information is confirmed by reading front PSN of last RUB before DMA area is fragmented, front PSN of first RUB after DMA area is fragmented, front PSN of last RUB before DMA mirror area is fragmented, and front PSN of first RUB after DMA mirror area is fragmented, which are contained in P&C. Based on the fragmentation information, it is possible to obtain search start PSN, which is used to detect (search for) locations of a DMA area and a DMA mirror area of the optical disc 12 in which newest DMSs are recorded.

In Step S12, the manager 41 detects the newest DMS recorded in a DMA area and the newest DMS recorded in a DMA mirror area.

Specifically, the manager 41 supplies search start PSN to the recording and reproducing processor 24, and instructs the recording and reproducing processor 24 to read data on and after search start PSN from a DMA area and a DMA mirror area. Then the recording and reproducing processor 24 controls the optical pickup 25 based on the instruction from the manager 41, reads data from the optical disc 12, and supplies the read data to the controller 22.

Based on the data supplied from the recording and reproducing processor 24, the manager 41 selects DMS in a DMA area, which has the largest update counter value such as DDS0 contents update count, and DMS in a DMA mirror area, which has the largest update counter value such as DDS0 contents update count. The manager 41 treats the DMSs having the largest update counter values as the newest DMS of the DMA area and the newest DMS of the DMA mirror area.

When the newest DMS of the DMA area and the newest DMS of the DMA mirror area are detected, the manager 41 confirms if DDS0 contents update count, DFL contents update count, SRRI contents update count, and DMA-Anchor contents update count contained in the DMS of the DMA area are consistent with DDS0 contents update count, DFL contents update count, SRRI contents update count, and DMA-Anchor contents update count contained in the DMS of the DMA mirror area, or not. In other words, the manager 41 confirms if the update counter values of the DMS of the DMA area are consistent with the update counter values of the DMS of the DMA mirror area or not. As a result, the manager 41 confirms consistency of the DMSs.

At this time, when the update counter values of the DMS of the DMA area are inconsistent with the update counter values of the DMS of the DMA mirror area, the DMS having the larger update counter values is treated as the newest DMS.

Further, the manager 41 instructs the recording and reproducing processor 24 to read the newest DMS from a DMA area and a DMA mirror area. Then the recording and reproducing processor 24 controls the optical pickup 25 based on the instruction from the manager 41 to read the newest DMS from the optical disc 12, and supplies the read DMS to the controller 22.

When the newest DMS is obtained as described above, the manager 41 obtains PDSD from the newest DMS. Further, the manager 41 obtains SRRI1 and DFLn as necessary.

In Step S13, the manager 41 generates temporary PDSD. In other words, the manager 41 sets 1 on Temporary DMS contained in control Flags of DDS0 of PDSD of the newest DMS, increments DDS0 contents update count by 1, and thereby generates temporary PDSD.

Note that, hereinafter, description will be made where SRRI and DFL are not extended, DMS only contains PDSD as a configuration element.

In Step S14, the manager 41 supplies the generated temporary PDSD to the recording and reproducing processor 24 to record the generated temporary PDSD in a DMA area and a DMA mirror area. The recording and reproducing processor 24 controls the optical pickup 25 based on PDSD supplied from the manager 41 to record the temporary PDSD in a DMA area and a DMA mirror area of the optical disc 12.

In Step S15, the controller 22 supplies user data, which is supplied with a write command from a superior host apparatus via the host I/F 21, to the recording and reproducing processor 24 with PSN of the recording location to record the user data in a user data area. The recording and reproducing processor 24 controls the optical pickup 25 based on the user data and PSN of the user-data recording location supplied from the controller 22 to record the user data in the specified area of the user data area, i.e., in the area determined based on the specified PSN.

In Step S16, the controller 22 determines whether an error has occurred or not when recording the user data. For example, the controller 22 determines that errors have occurred when the recording and reproducing processor 24 informs the controller 22 that various errors such as a servo error have occurred when recording the user data.

When it is determined that no error has occurred in Step S16, in Step S17, the controller 22 determines if the user data has been written correctly or not. In other words, the user data is verified.

For example, after the user data is recorded, the controller 22 instructs the recording and reproducing processor 24 to read the recorded user data. Then the recording and reproducing processor 24 controls the optical pickup 25 based on the instruction from the controller 22 to read the user data, which is recorded in the process of Step S15, from the optical disc 12, and supplies the user data to the controller 22.

When the user data read from the optical disc 12 and supplied from the recording and reproducing processor 24 is consistent with the user data, which is instructed to record, the controller 22 determines that the user data has been written correctly.

When it is determined that the user data has been written correctly in Step S17, in Step S18, the manager 41 generates DMS.

For example, the manager 41 sets 0 on (resets) Temporary DMS contained in control Flags of DDS0 of PDSD generated in the process of Step S13, and updates Last Recorded SPSN of SRR entry in which the user data is recorded.

Figure 17:
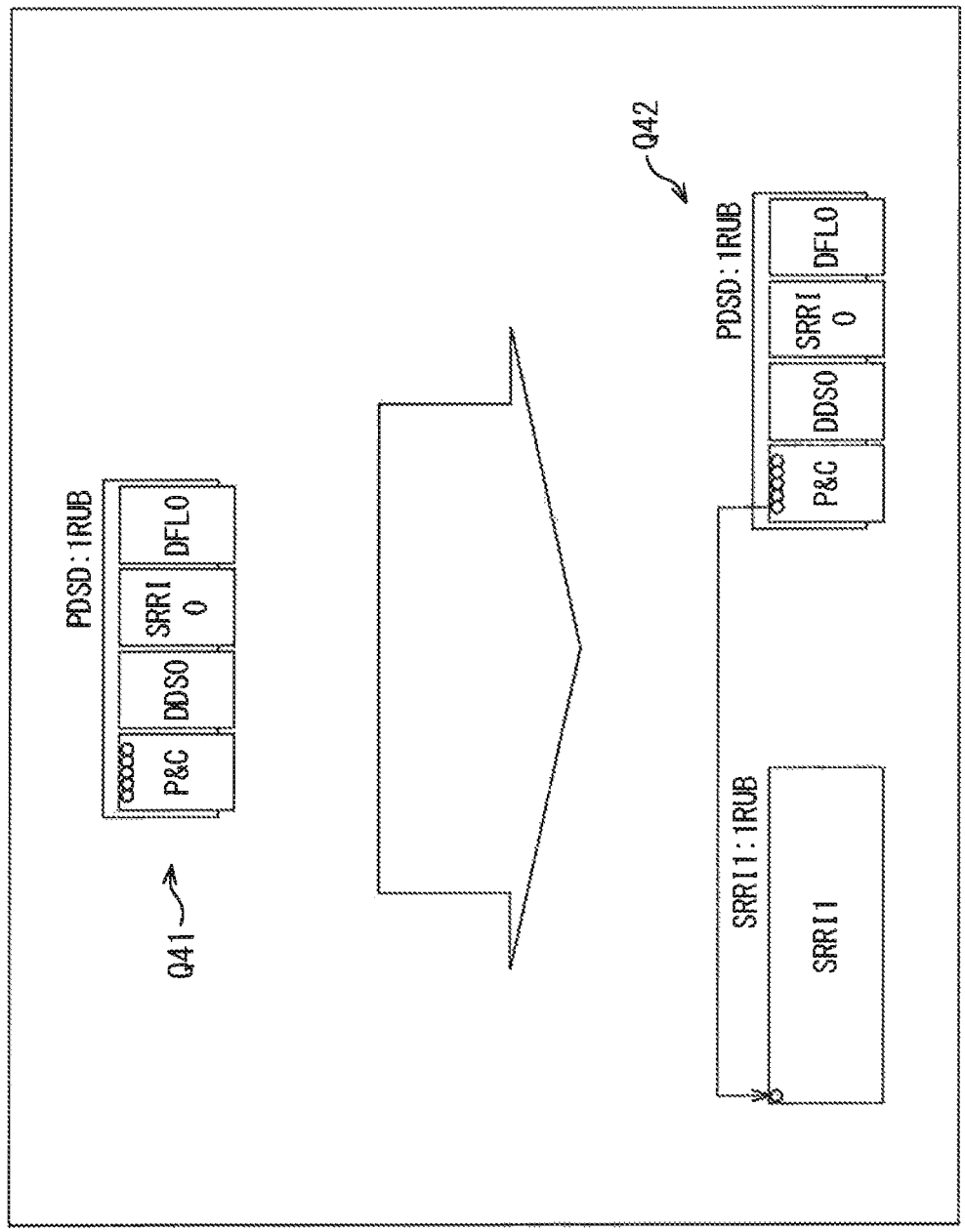
FIG. 17 A diagram illustrating how to extend SRRI.

Note that, at this time, the manager 41 adds a new SRR entry as necessary, and, when it is necessary to extend SRRI, performs the process described with reference to FIG. 17 to generate SRRI1. Here, to make the description simple, no SRR entry is added and SRRI is not extended.

Further, the manager 41 respectively increments DDS0 contents update count and SRRI contents update count of P&C by 1 to thereby obtain the newest PDSD, i.e., DMS. Note that the newest DMS to be recorded in a DMA area and the newest DMS to be recorded in a DMA mirror area are generated.

In Step S19, the manager 41 supplies the generated newest DMSs, i.e., PDSDs, to the recording and reproducing processor 24 to record the generated newest DMSs, i.e., PDSDs, in a DMA area and a DMA mirror area. The recording and reproducing processor 24 controls the optical pickup 25 based on PDSDs supplied from the manager 41 to record PDSDs in a DMA area and a DMA mirror area of the optical disc 12.

Note that, when DMS contains not only PDSD but also SRRI1, SRRI1s are firstly recorded in a DMA area and a DMA mirror area, and then PDSDs are generated and recorded in the DMA area and the DMA mirror area. As a result, it is possible to reduce consumption of DMA areas and DMA mirror areas because the content of PDSD is not changed even if PDSD is rewritten.

Further, DMS (PDSD) may be recorded anytime. For example, when recording some continuous pieces of user data, DMS may be recorded after recording most of the user data, or after recording all the user data and just before ejecting the optical disc 12, for example.

As described above, after user data is recorded in the optical disc 12 and DMSs changed accordingly are recorded in a DMA area and a DMA mirror area, the recording and reproducing apparatus 11 ejects the optical disc 12, and the data recording processing is completed.

Further, when it is determined that an error has occurred in Step S16, or when it is determined that user data has been written incorrectly in Step S17, the process proceeds to Step S20.

In Step S20, the alternating processing unit 42 performs the alternating processing to record record-failed user data in an area, which is different from the area specified by the host apparatus.

For example, the alternating processing unit 42 selects, as the alternate-destination for recording user data, a recordable area from Next available PSN of DS0 L0 inner Spare00 to Next available PSN of DS1 L2 outer Spare15 contained in the newest DMS, i.e., DDS0 of PDSD.

Then the alternating processing unit 42 supplies the record-failed user data and the selected alternate-destination PSN to the recording and reproducing processor 24, and instructs the recording and reproducing processor 24 to record the user data in the alternate-destination. Then the recording and reproducing processor 24 controls the optical pickup 25 based on the user data and the alternate-destination PSN supplied from the alternating processing unit 42 to record the user data in the specified area of a spare area, i.e., the area determined based on the specified PSN.

In Step S21, the controller 22 determines whether user data has been written correctly or not. The process of Step S21 is similar to the process of Step S17. In other words, the user data is verified.

When it is determined that user data has been written incorrectly in Step S21, the process returns to Step S20, and the above-mentioned processes are repeated. In other words, a new alternate-destination is selected, and the user data is recorded in the new alternate-destination.

When it is determined that user data has been written correctly in Step S21, in Step S22, the manager 41 performs DMA processing. In other words, the manager 41 generates DMS, to which DFL entry is added in the alternating processing, and records the DMS in a DMA area of the optical disc 12.

In Step S23, the manager 41 performs DMA mirror processing. In other words, the manager 41 generates DMS, to which DFL entry is added in the alternating processing, and records the DMS in a DMA mirror area of the optical disc 12.

Note that the DMA processing and the DMA mirror processing will be described later in detail. As described above, when the newest DMSs are recorded in the optical disc 12, the data recording processing is completed.

As described above, the recording and reproducing apparatus 11 records user data in the optical disc 12, and records DMSs in a DMA area and a DMA mirror area as necessary. As described above, DMSs, i.e., management information, are recorded in a DMA area and a DMA mirror area, and thereby multiplexed. As a result, it is possible to prevent DMS from being unreadable because of defects or the like, and to increase reliability of the optical disc 12 against defects.

Further, because DMS contains PDSD, i.e., basic management information, and SRRI1 and DFLn, i.e., extended management information, as configuration elements, typically, it is only necessary to record PDSD as management information. As a result, it is possible to reduce consumption of DMA areas and DMA mirror areas.

<Description of DMA Processing>

Next, with reference to the flowchart of FIG. 26, the DMA processing corresponding to the process of Step S22 of FIG. 25 will be described.

In Step S51, the manager 41 determines whether DMA trouble flag, which is contained in DMA Flag of P&C of PDSD of the newest DMS, is set or not.

When it is determined that a DMA trouble flag is set in Step S51, i.e., when a DMA area has a trouble or a DMA area has no recordable area anymore, the manager 41 determines that this is a DMA trouble status in which a DMA area has a trouble and that it is not possible to record DMS in a DMA area. The DMA processing is thus completed. In short, the process then proceeds to Step S23 of FIG. 25.

To the contrary, when it is determined that a DMA trouble flag is not set in Step S51, in Step S52, the manager 41 determines whether a trouble has occurred in the recording processing in a DMA area or not.

For example, when it is determined that an error has occurred again and again in Step S54 (described later), or when it is determined that data has been written incorrectly again and again in Step S55 (described later), it is determined that a trouble has occurred in the recording processing in a DMA area.

When it is determined that no trouble has occurred in Step S52, in Step S53, the manager 41 performs the DMA recording processing. Note that the DMA recording processing will be described later, in which DMS is generated and recorded in a DMA area.

In Step S54, the controller 22 determines whether an error has occurred in a DMS recording operation or not. For example, when the recording and reproducing processor 24-2 informs the controller 22 that various errors such as a servo error have occurred when recording DMS, the controller 22 determines that an error has occurred.

When it is determined that no error has occurred in Step S54, in Step S55, the controller 22 determines whether DMS has been written correctly or not. In other words, DMS is verified.

For example, after recording DMS, the controller 22 instructs the recording and reproducing processor 24-2 to read the recorded DMS. Then the recording and reproducing processor 24-2 controls the optical pickup 25-2 based on the instruction from the controller 22 to read DMS recorded in the process of Step S53 from a DMA area of the optical disc 12, and supplies DMS to the controller 22.

When the DMS read from the optical disc 12 and supplied from the recording and reproducing processor 24-2 is consistent with the DMS, which is instructed to record, the controller 22 determines that the DMS has been written correctly.

When it is determined that the DMS has been written correctly in Step S55, the DMA processing is completed. To the contrary, When it is determined that the DMS has been written incorrectly in Step S55, the process returns to Step S52, and the above-mentioned processes are repeated.

In this case, in the next Step S53, DMS is recorded in the next DMA area. In short, when not a servo error or the like but a verify error has occurred, fragmentation information is not recorded, and PDSD is not updated. So update counters are not updated, either.

Further, when it is determined that an error has occurred in Step S54, in Step S56, the manager 41 records fragmentation information in a DMA anchor area.

In other words, the manager 41 generates DMS (PDSD), which contains fragmentation information in the part W14 or the like of FIG. 5 of P&C for example, supplies DMS (PDSD) to the recording and reproducing processor 24, and instructs the recording and reproducing processor 24 to record DMS (PDSD) in a DMA anchor area. Then the recording and reproducing processor 24 controls the optical pickup 25 based on DMS supplied from the manager 41 to record DMS in a DMA anchor area of the optical disc 12.

After DMS containing fragmentation information is recorded, the process returns to Step S52, and the above-mentioned processes are repeated.

Further, when it is determined that a trouble has occurred in the recording processing in a DMA area in Step S52, in Step S57, the manager 41 records fragmentation information in a DMA anchor area.

In other words, the manager 41 generates DMS, which contains fragmentation information in the part W14 or the like of FIG. 5 of P&C for example and contains DMA Flag containing a set DMA trouble flag, supplies DMS to the recording and reproducing processor 24, and instructs the recording and reproducing processor 24 to record DMS in a DMA anchor area. The recording and reproducing processor 24 controls the optical pickup 25 based on DMS supplied from the manager 41 to record DMS in a DMA anchor area of the optical disc 12.

After DMS containing fragmentation information is recorded, the DMA processing is completed. In short, the process then proceeds to Step S23 of FIG. 25.

As described above, after the alternating processing is performed where a user data area is an alternate-origin, the recording and reproducing apparatus 11 updates DMS and records DMS in a DMA area.

<Description of DMA Recording Processing>

Next, with reference to the flowchart of FIG. 27, the DMA recording processing corresponding to the process of Step S53 of FIG. 26 will be described.

In Step S81, the manager 41 determines whether a DFL entry is to be recorded or not in new DFLn, i.e., whether DFL is to be newly extended or not. It is determined that a DFL entry is to be recorded in new DFLn, for example, when a DFL entry cannot be recorded in DFL0 of the newest DMS anymore, i.e., when DFL0 is full.

When it is determined that a DFL entry is not to be recorded in DFLn in Step S81, in Step S82, the manager 41 sets 00h for P&C indicator of P&C of PDSD of the newest DMS.

Figure 25:
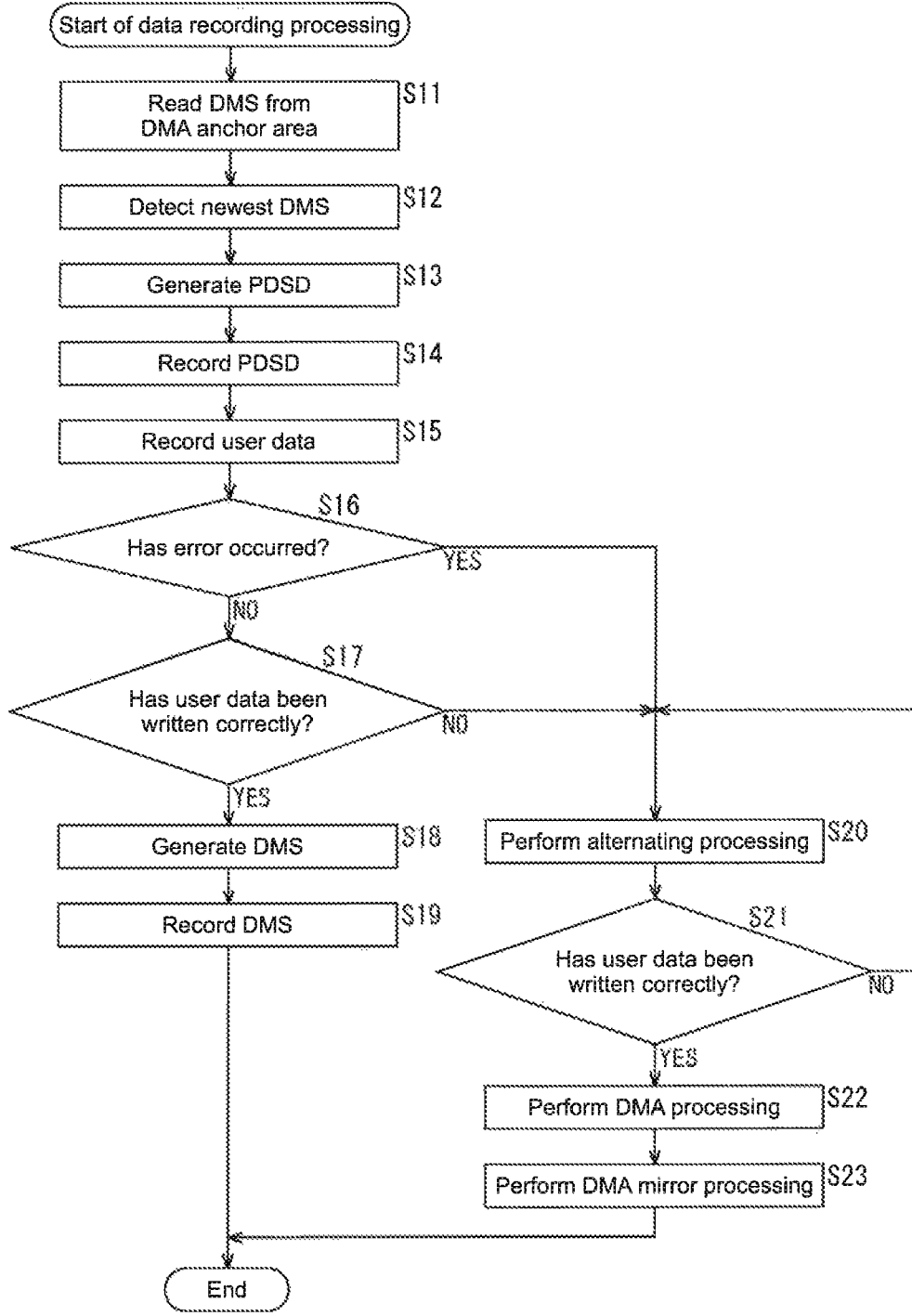
FIG. 25 A diagram illustrating how to finalize the optical disc.

In Step S83, the manager 41 adds DFL entry, which shows the alternate-origin and the alternate-destination in the alternating processing of Step S20 of FIG. 25, to DFL0 of PDSD of DMS.

In Step S84, the manager 41 increments DFL contents update count of P&C of PDSD of DMS by 1.

In Step S85, the manager 41 updates Next available PSN of DDS0 of PDSD of DMS.

For example, when user data is recorded in an area of Spare00, i.e., a spare area of the DS0 surface, as an alternate-destination in the alternating processing of Step S20, the manager 41 stores the next recordable PSN value as Next available PSN of DS0 L0 inner Spare00.

In Step S86, the manager 41 increments DDS0 contents update count of P&C of PDSD of DMS by 1.

According to the above-mentioned processing, PDSD of the newest DMS to be recorded in a DMA area is generated. In this example, DMS only contains PDSD as a configuration element, or contains PDSD and already-recorded DFLn as configuration elements. Further, Temporary DMS contained in control Flags of DDS0 of PDSD is 0.

In Step S87, the manager 41 supplies the generated newest PDSD to the recording and reproducing processor 24-2 to record the generated newest PDSD in a DMA area. The recording and reproducing processor 24-2 controls the optical pickup 25-2 based on PDSD supplied from the manager 41 to record PDSD in a DMA area of the optical disc 12.

Figure 26:
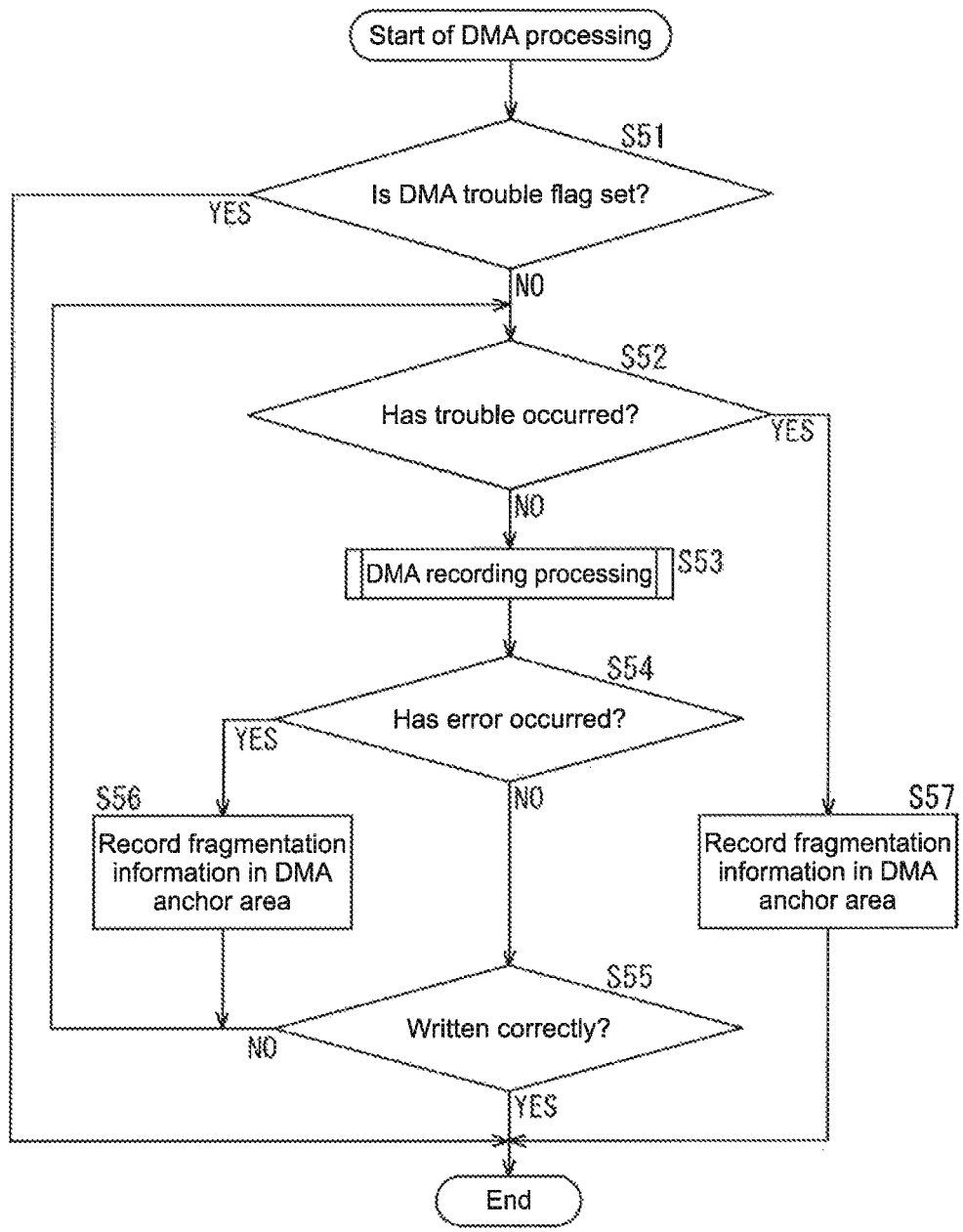
FIG. 26 A flowchart illustrating DMA processing.

After PDSD is recorded, the DMA recording processing is completed, and the process proceeds to Step S54 of FIG. 26 after that.

Further, when it is determined that a DFL entry is to be recorded in new DFLn in Step S81, in Step S88, the manager 41 sorts DFL entries.

Specifically, for example, as described above with reference to FIG. 18, the manager 41 sorts all the DFL entries already recorded in DFL0 and all the DFL entries already recorded in DFLn. In this case, the manager 41 deletes DFL entries as necessary to prevent redundancy of DFL entries from occurring. Note that when no DFLn has been generated at this time, DFL entries of DFL0 are sorted.

In Step S89, the manager 41 generates DFLn containing the DFL entries sorted in the process of Step S88. For example, DFL1 and DFL2 are generated when it is necessary to prepare DFL1 and DFL2 to store all the DFL entries.

In Step S90, the manager 41 supplies the generated DFLn to the recording and reproducing processor 24-2 to record the generated DFLn in a DMA area. The recording and reproducing processor 24-2 controls the optical pickup 25-2 based on DFLn supplied from the manager 41 to record DFLn in the DMA area of the optical disc 12.

After DFLn is recorded in a DMA area correctly, the process proceeds to Step S91. Note that, more specifically, if DFLn is recorded incorrectly, DFLn is rewritten as necessary.

In Step S91, the manager 41 sets 00h for P&C indicator of P&C of PDSD of the newest DMS.

In Step S92, the manager 41 sets First SPSN of DS0/DS1 DFLn contained in P&C of PDSD of DMS. For example, when DFL1 and DFL2 are generated in Step S90, SPSN of the front location of the recorded DFL1 is stored as First SPSN of DS0/DS1 DFL1, and SPSN of the front location of the recorded DFL2 is stored as First SPSN of DS0/DS1 DFL2.

After the process of Step S92, the process of Step S93 to the process of Step S95 are performed, which are similar to the process of Step S84 to the process of Step S86. So description thereof will be omitted.

According to the above-mentioned process of Step S91 to process of Step S95, PDSD of the newest DMS to be recorded in a DMA area is generated. In this example, DMS contains PDSD and DFLn as configuration elements, and DFLn is already recorded in a DMA area in the process of Step S90. Further, Temporary DMS contained in control Flags of DDS0 contained in PDSD is 0.

In Step S96, the manager 41 supplies PDSD of the generated newest DMS to the recording and reproducing processor 24-2 to record the generated newest DMS in a DMA area. The recording and reproducing processor 24-2 controls the optical pickup 25-2 based on PDSD supplied from the manager 41 to record PDSD in a DMA area of the optical disc 12.

After recording PDSD, the DMA recording processing is completed, and then the process proceeds to Step S54 of FIG. 26.

As described above, the recording and reproducing apparatus 11 generates and records only PDSD when DFL is not extended newly, and generates and records PDSD and DFLn when DFL is extended newly. As described above, by preparing DFLn as extended management information (extended area), it is possible to reduce consumption of DMA areas.

<Description of DMA Mirror Processing>

Figure 28:
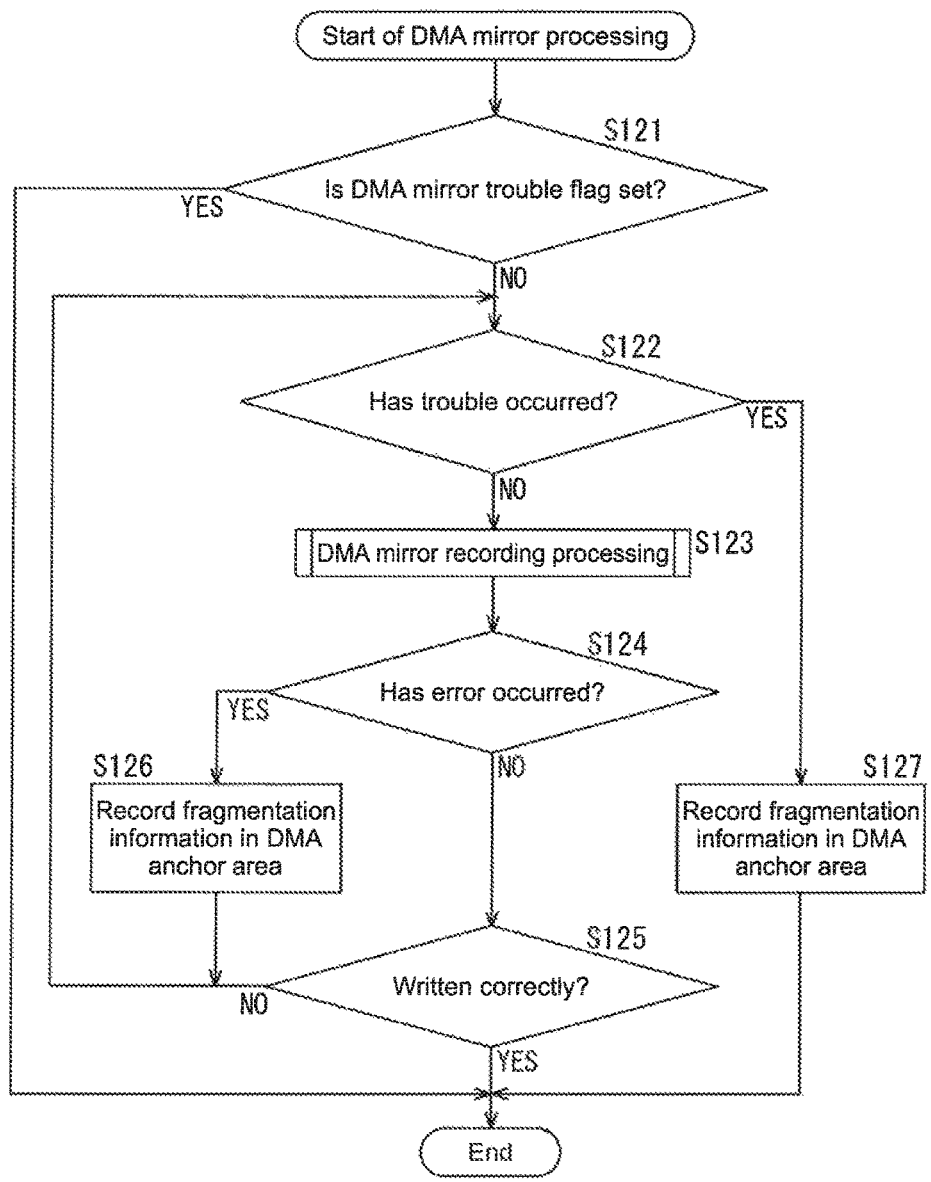
FIG. 28 A flowchart illustrating DMA mirror processing.

Further, the recording and reproducing apparatus 11 performs the DMA mirror processing of FIG. 28 corresponding to the process of Step S23 of FIG. 25.

Note that the process of Step S121 to the process of Step S127 in the DMA mirror processing of FIG. 28 are similar to the process of Step S51 to the process of Step S57 in the DMA processing of FIG. 26. So description thereof will be omitted.

Note that although a DMA area is processed in the DMA processing of FIG. 26, a DMA mirror area is processed in the DMA mirror processing of FIG. 28. Because of this, it is determined whether DMA mirror trouble flag is set or not in Step S121, and it is determined whether a DMA mirror area has a trouble or not in Step S122.

Note that the DMA processing and the DMA mirror processing can be performed in parallel.

<Description of DMA Mirror Recording Processing>

Figure 29:
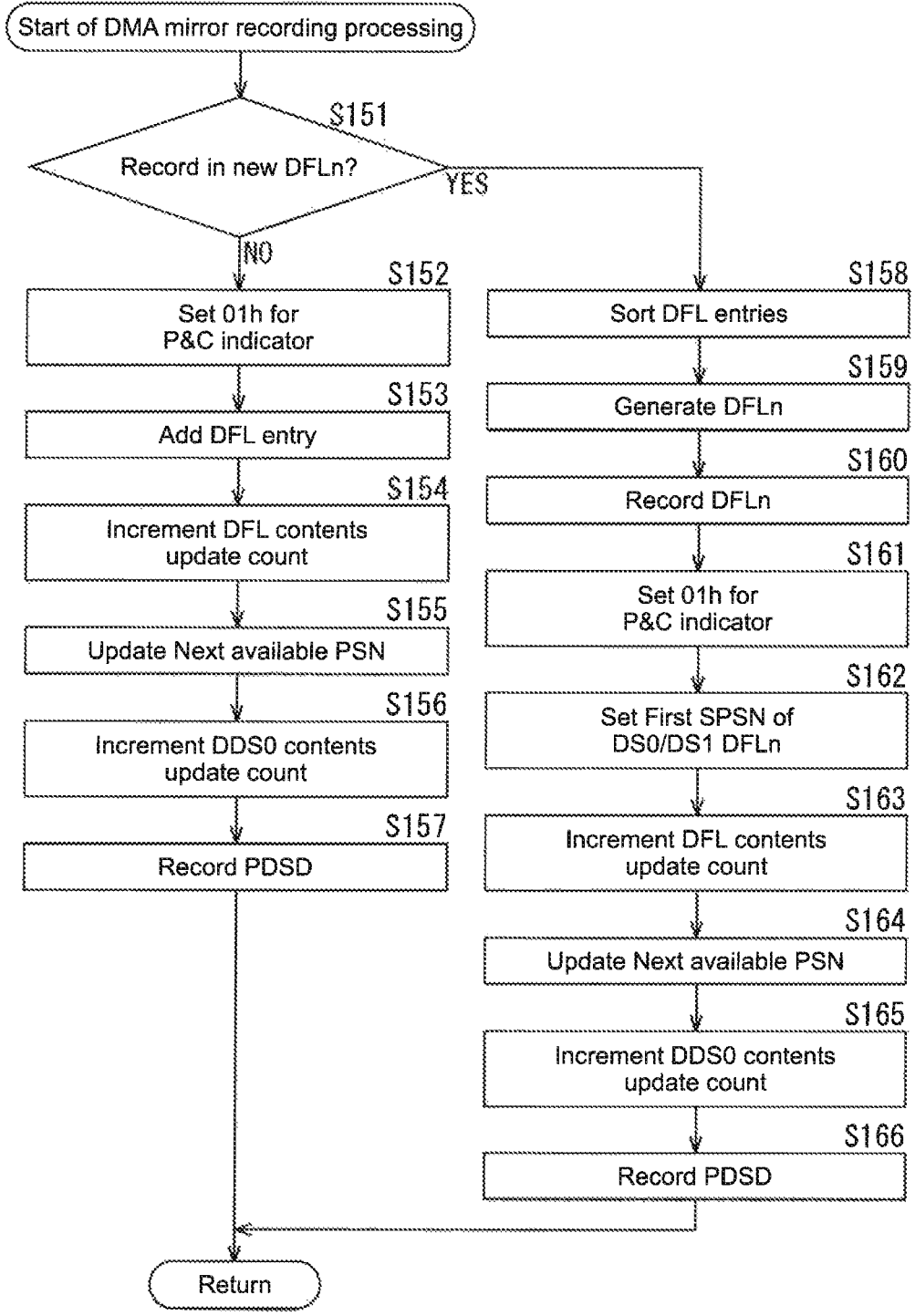
FIG. 29 A flowchart illustrating DMA mirror recording processing.

Further, the DMA mirror recording processing of FIG. 29 is performed as the DMA mirror recording processing of Step S123 in the DMA mirror processing of FIG. 28.

Figure 27:
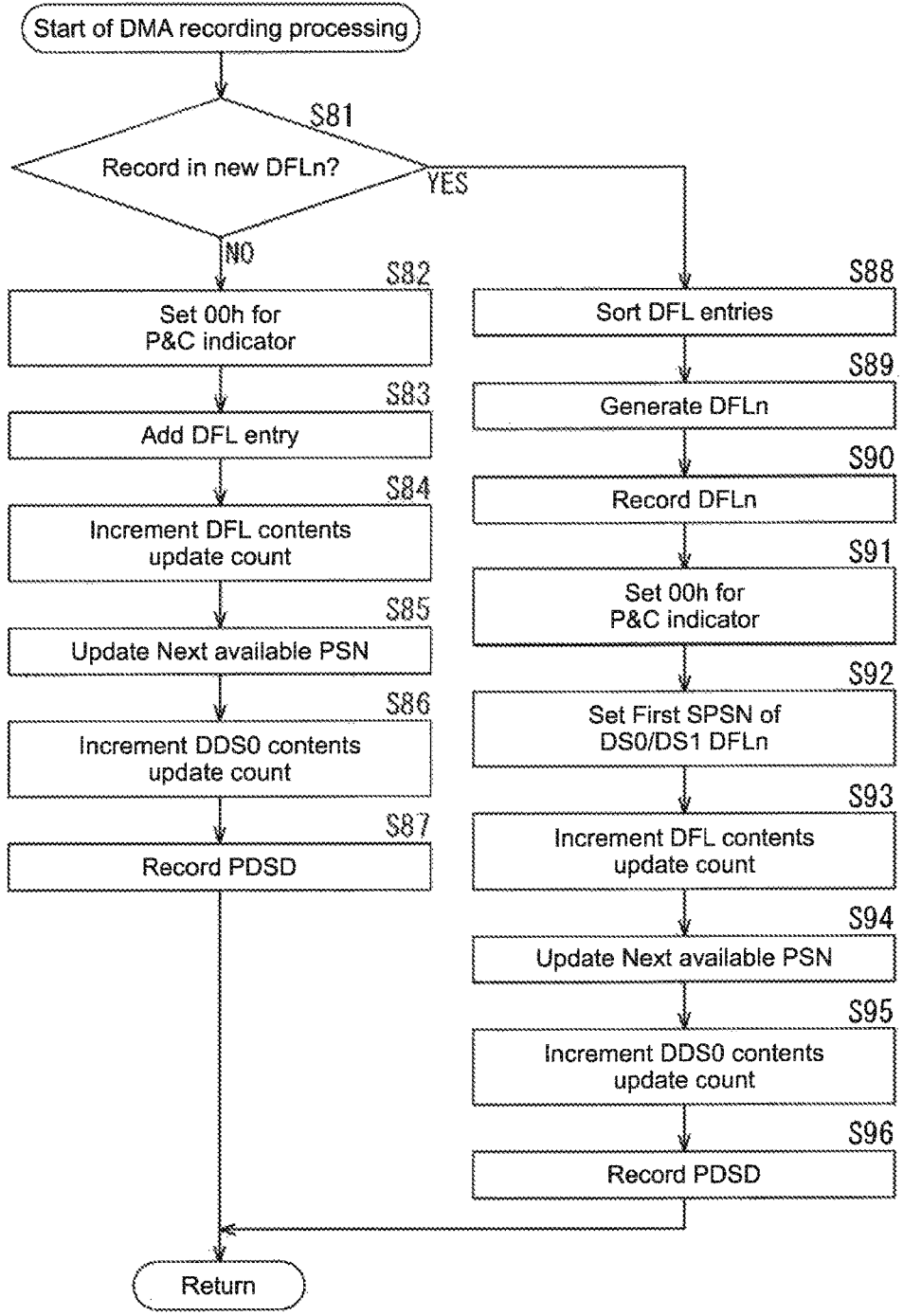
FIG. 27 A flowchart illustrating DMA recording processing.

Note that the process of Step S151 to the process of Step S166 in the DMA mirror recording processing of FIG. 29 are similar to the process of Step S81 to the process of Step S96 in the DMA recording processing of FIG. 27. So description thereof will be omitted.

Note that 01h is set for P&C indicator of P&C of PDSD in Step S152 and Step S161. Further, DFLn and PDSD are recorded in a DMA mirror area.

<Description of Recording Status Determining Processing>

Figure 30:
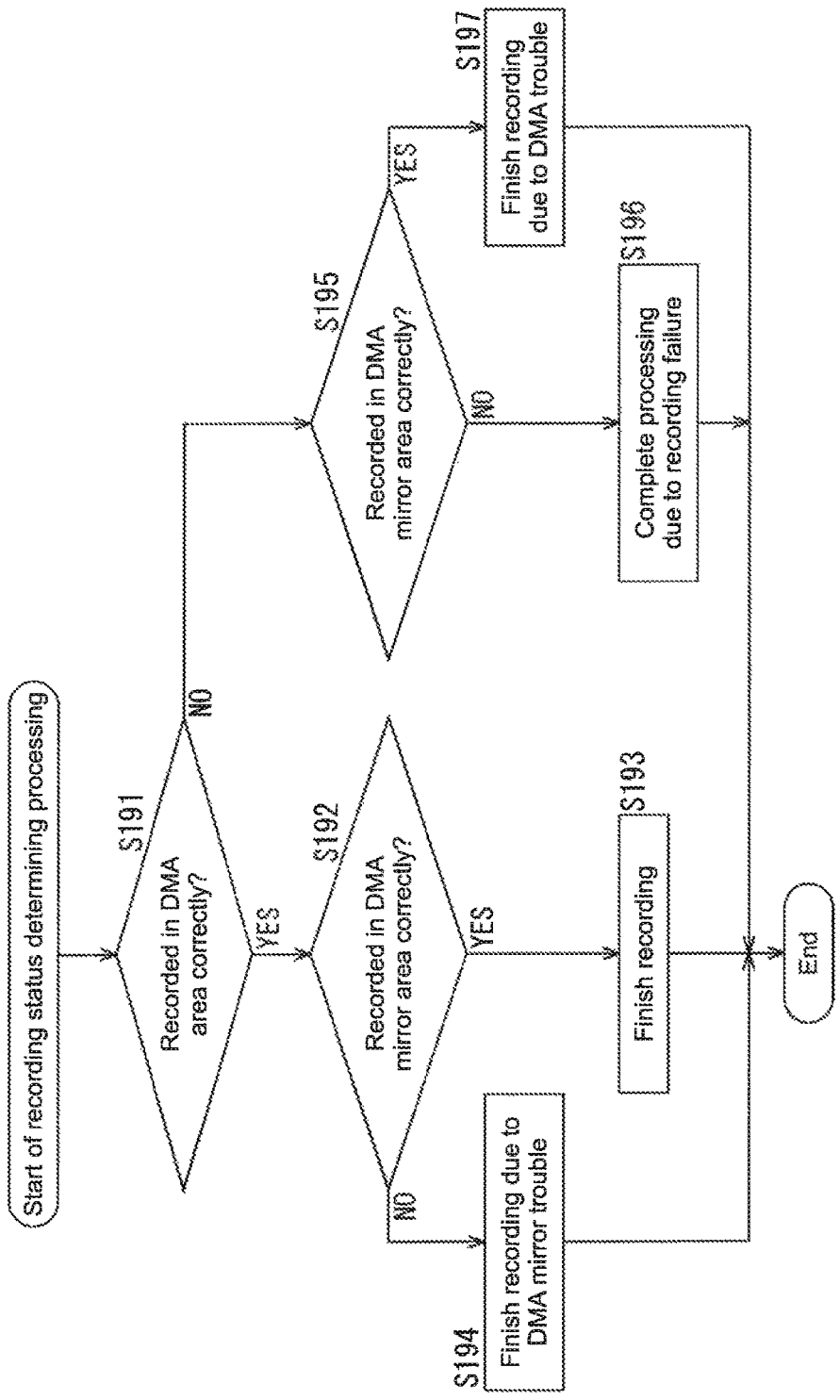
FIG. 30 A flowchart illustrating recording status determining processing.

Further, in the processes described above with reference to FIG. 26 and FIG. 28, DMS may not be recorded in a DMA area or a DMA mirror area when a DMA area or a DMA mirror area has a trouble. Because of this, more specifically, the recording and reproducing apparatus 11 performs the recording status determining processing of FIG. 30 to determine whether DMS is recorded after the DMA processing and the DMA mirror processing.

hereinafter, with reference to the flowchart of FIG. 30, the recording status determining processing that the recording and reproducing apparatus 11 performs will be described.

In Step S191, the manager 41 determines whether DMS is recorded in a DMA area correctly or not. For example, when it is determined that DMS is written correctly in Step S55 of FIG. 26 and the DMA processing is completed, it is determined that DMS is recorded in a DMA area correctly.

When it is determined that DMS is recorded correctly in Step S191, in Step S192, the manager 41 determines whether DMS is recorded in a DMA mirror area correctly or not. For example, when it is determined that DMS is written correctly in Step S125 of FIG. 28 and the DMA mirror processing is completed, it is determined that DMS is recorded in a DMA mirror area correctly.

When it is determined that DMS is recorded correctly in Step S192, it means that DMS is recorded in a DMA area correctly and DMS is recorded in a DMA mirror area correctly. So the manager 41 finishes recording in Step S193 since recording has been performed without any problem. The recording status determining processing is thus completed.

To the contrary, when it is determined that DMS is not recorded correctly in Step S192, in Step S194, the manager 41 finishes recording of user data because a DMA mirror trouble has occurred. The recording status determining processing is thus completed.

In this case, although DMS cannot be recorded in a DMA mirror area, DMS is recorded in a DMA area. It happens when, for example, the DMA processing is completed because it is determined that DMS is written correctly in Step S55 of FIG. 26 and, in addition, the DMA mirror processing is completed because it is determined that DMA mirror trouble flag is set in Step S121 of FIG. 28.

Further, when it is determined that DMS is recorded incorrectly in Step S191, in Step S195, the manager 41 determines whether DMS is recorded in a DMA mirror area correctly or not.

When it is determined that DMS is recorded in a DMA mirror area incorrectly in Step S195, in Step S196, the manager 41 completes the recording status determining processing due to the recording failure.

In this case, since DMS cannot be recorded in a DMA area and a DMA mirror area, the manager 41 informs the superior host apparatus via the host I/F 21 of recording failure of user data. It happens when, for example, the DMA processing is completed because it is determined that DMA trouble flag is set in Step S51 of FIG. 26 and, in addition, the DMA mirror processing is completed because it is determined that DMA mirror trouble flag is set in Step S121 of FIG. 28.

Further, when it is determined that DMS is recorded in a DMA mirror area correctly in Step S195, in Step S197, the manager 41 finishes recording of user data because a DMA trouble has occurred. The recording status determining processing is thus completed.

As described above, the recording and reproducing apparatus 11 determines the recording status based on the results of the DMA processing and the DMA mirror processing.

<Description of Finalization Processing>

Further, the finalization processing will be described, which is performed when a superior host apparatus instructs to finalize the optical disc 12 where the optical disc 12 is inserted in the recording and reproducing apparatus 11, i.e., where the manager 41 has the newest DMS.

Figure 31:
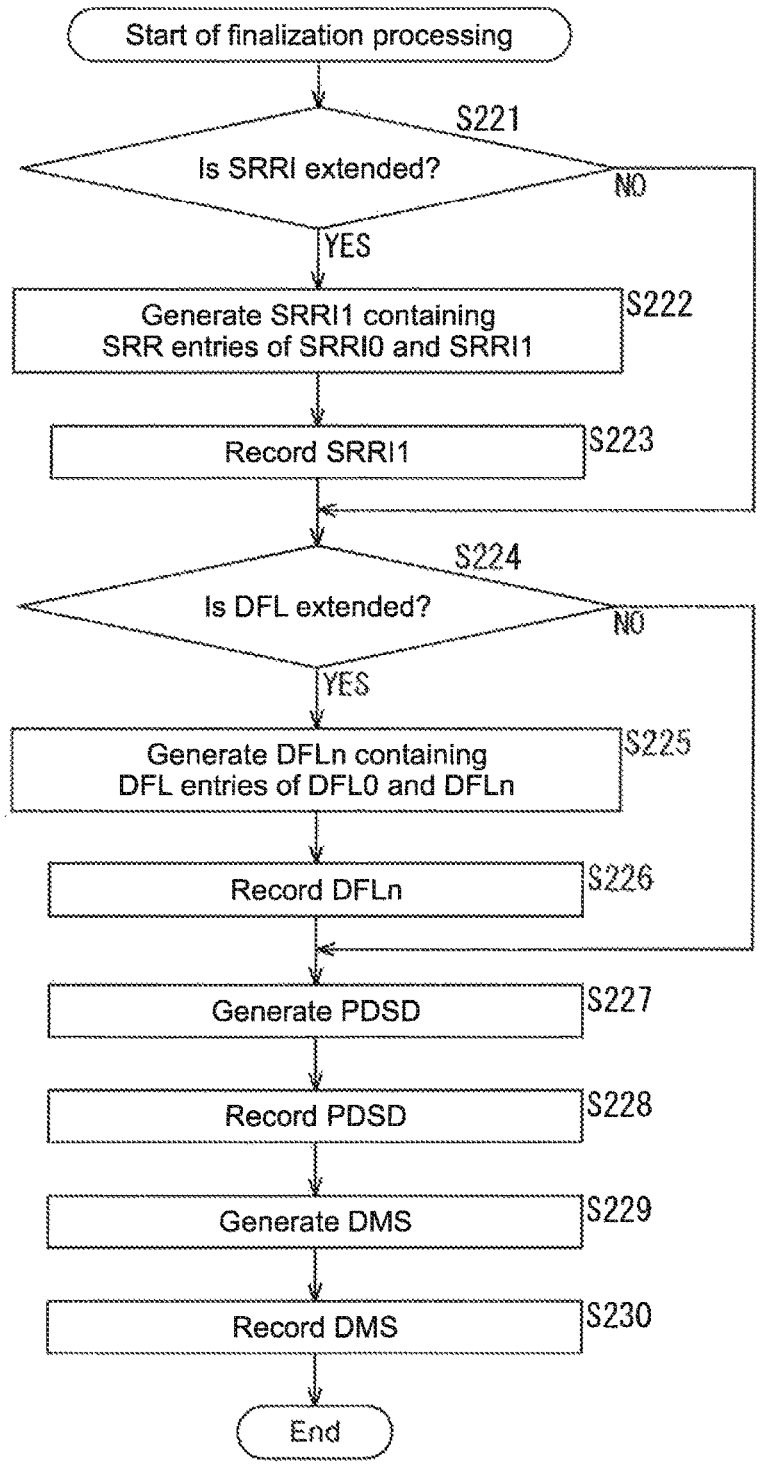
FIG. 31 A flowchart illustrating finalization processing.

Hereinafter, with reference to the flowchart of FIG. 31, the finalization processing that the recording and reproducing apparatus 11 performs will be described.

In Step S221, the manager 41 determines whether SRRI is extended or not based on the newest DMS temporarily recorded in the memory 23 or the like, for example. For example, when DMS contains SRRI1 as a configuration element, it is determined that SRRI is extended.

When it is determined that SRRI is extended in Step S221, in Step S222, the manager 41 generates SRRI1 containing all the SRR entries of SRRI0 and SRRI1. In other words, for example, as described above with reference to FIG. 20, the manager 41 closes all the sessions and SRRs, and generates SRRI1 containing all the closed SRR entries, which are sorted.

In Step S223, the manager 41 supplies the generated SRRI1 to the recording and reproducing processor 24 to record the generated SRRI1 in a DMA area and a DMA mirror area. The recording and reproducing processor 24 controls the optical pickup 25 based on SRRI1 supplied from the manager 41 to record SRRI1 a DMA area and a DMA mirror area of the optical disc 12.

When it is determined that SRRI1 is recorded in Step S223 or when it is determined that SRRI is not extended in Step S221, the manager 41 determines whether DFL is extended or not based on the newest DMS in Step S224. For example, it is determined that DFL is extended when DMS contains DFLn as a configuration element.

When it is determined that DFL is extended in Step S224, in Step S225, the manager 41 generates DFLn containing DFL entries of DFL0 and DFLn. In other words, for example, as described above with reference to FIG. 22, the manager 41 generates new DFLn storing all the DFL entries already recorded in DFL0 and DFLn, which are sorted without redundancy.

For example, DFL entries are already recorded in DFL0, DFL1, and DFL2, and DFL2 has an enough area to store the DFL entry already stored in DFL0. In this case, the manager 41 sorts all the DFL entries already recorded in DFL0, DFL1, and DFL2, and stores all the DFL entries in new DFL1 and new DFL2.

In Step S226, the manager 41 supplies newly generated DFLn to the recording and reproducing processor 24 to record DFLn in a DMA area and a DMA mirror area. The recording and reproducing processor 24 controls the optical pickup 25 based on DFLn supplied from the manager 41 to record DFLn in a DMA area and a DMA mirror area of the optical disc 12.

Note that, in the above-mentioned example, SRRI1 is recorded and then DFLn is recorded. Instead, SRRI1 may be recorded after DFLn is recorded.

When DFLn is recorded in Step S226 or when it is determined that DFL is not extended in Step S224, in Step S227, the manager 41 generates PDSD.

In this case, when SRRI is not extended, the manager 41 sorts and stores all the SRR entries, which are already stored in SRRI0, in SRRI0 of newly generated PDSD. To the contrary, when SRRI1 is generated in Step S222, no SRR entry is stored in SRRI0 of newly generated PDSD. Further, when SRRI1 is generated, pointer information showing SPSN of SRRI1, which is recorded in a DMA area or a DMA mirror area, is contained in P&C of newly generated PDSD.

Further, when DFL is not extended, the manager 41 sorts and stores all the DFL entries, which are already stored in DFL0, in DFL0 of newly generated PDSD. To the contrary, when DFLn is generated in Step S225, no DFL entry is stored in DFL0 of newly generated PDSD. Further, when DFLn is generated, pointer information showing SPSN of DFLn, which is recorded in a DMA area or a DMA mirror area, is contained in P&C of newly generated PDSD.

PDSD to be recorded in a DMA area and PDSD to be recorded in a DMA mirror area are thus generated.

In Step S228, the manager 41 supplies newly generated PDSDs to the recording and reproducing processor 24 to record PDSDs in a DMA area and a DMA mirror area. The recording and reproducing processor 24 controls the optical pickup 25 based on PDSD supplied from the manager 41 to record PDSDs in a DMA area and a DMA mirror area of the optical disc 12.

In Step S229, the manager 41 generates DMS to be recorded in a DMA anchor area. For example, the manager 41 generates, as DMS, PDSD similar to PDSD generated in the process of Step S227.

In this case, for example, P&C indicator value contained in P&C is 04h. PSNs of recording start locations of PDSD, SRRI1, and DFLn in the DS0 surface and the DS1 surface and other information are recorded in the part W15 of P&C of FIG. 5.

In Step S230, the manager 41 supplies DMS, which is generated for a DMA anchor area, to the recording and reproducing processor 24 to record DMS in a DMA anchor area. The recording and reproducing processor 24 controls the optical pickup 25 based on DMS supplied from the manager 41 to record DMS in a DMA anchor area of the optical disc 12.

When DMS is recorded and the optical disc 12 is finalized (closed), the optical disc 12 is ejected from the recording and reproducing apparatus 11, and the finalizing process is thus completed.

As described above, the recording and reproducing apparatus 11 generates DMS, in which all the SRR entries are stored in SRRI0 or SRRI1 and all the DFL entries are stored in DFL0 or one or more DFLns, and records DMS in the optical disc 12. As a result, it is possible to manage SRR entries and DFL entries more easily after finalization, and it is possible to further reduce time to mount.

Meanwhile, the above-mentioned series of processing may be executed by hardware or may be executed by software. If the series of processing is executed by software, a program configuring that software is installed into a nonvolatile memory (not shown) of the controller 22 and a nonvolatile memory (not shown) of the recording and reproducing processor 24, for example.

In this case, for example, the above-mentioned series of processing is performed by the controller 22 and the recording and reproducing processor 24 executing the program recorded in the memories (not shown).

Note that the program executed by the controller 22 and the recording and reproducing processor 24 may be a program for executing processing in time series in the order described in the present description, a program for executing processing in parallel, or a program for executing processing as necessary, e.g., when processing is called.

Note that embodiments of the present technology are not limited to the above-mentioned embodiments and various modifications can be made without departing from the gist of the present technology.

Further, one apparatus may execute or apparatuses may divisionally execute the steps described above with reference to the flowcharts.

Further, when one step includes a plurality of processes, one apparatus may execute or apparatuses may divisionally execute the processes of the one step.

It should be noted that the effect described in the present description is merely an example, and is not necessarily limitative. Any other effect may be obtained.

It should be noted that the present technology may take the following configurations.

(1)

A recording control apparatus, including:

a recording controller that controls recording of data in a write-once recording medium; and a manager that controls the recording controller to record pieces of basic management information in the recording medium, the basic management information storing information on a recording range of the recording medium, the basic management information storing a counter showing the number of times of updating content of the basic management information.

(2)

The recording control apparatus according to (1), in which the recording medium includes a first surface capable of recording data and a second surface capable of recording data, and the manager records the basic management information in the first surface and the second surface.

(3)

The recording control apparatus according to (1) or (2), in which the basic management information contains no pointer information showing a recording location of information contained in the basic management information.

(4)

The recording control apparatus according to any one of (1) to (3), in which the manager records, when the basic management information having a predetermined size cannot store the information on the recording range anymore, extended management information and new basic management information in the recording medium, the extended management information storing the information on the recording range, the information on the recording range having been stored in the basic management information, the new basic management information storing pointer information showing a recording location of the extended management information in the recording medium.

(5)

The recording control apparatus according to (4), in which the manager records the new basic management information after the manager records the extended management information.

(6)

The recording control apparatus according to (4) or (5), in which the counter stored in the basic management information includes a counter showing the number of times of updating content of the basic management information and a counter showing the number of times of updating content of the extended management information.

(7)

The recording control apparatus according to any one of (1) to (6), in which the pieces of basic management information are recorded in the recording medium before the recording medium is finalized.

(8)

A recording control method, including the step of;

controlling a recording controller that controls recording of data in a write-once recording medium to record pieces of basic management information in the recording medium, the basic management information storing information on a recording range of the recording medium, the basic management information storing a counter showing the number of times of updating content of the basic management information.

(9)

A program, causing a computer to execute processing including the step of:

controlling a recording controller that controls recording of data in a write-once recording medium to record pieces of basic management information in the recording medium, the basic management information storing information on a recording range of the recording medium, the basic management information storing a counter showing the number of times of updating content of the basic management information.

(10)

A drive controlling controller, including:

a manager that records pieces of basic management information in a write-once recording medium, the basic management information storing information on a recording range of the recording medium, the basic management information storing a counter showing the number of times of updating content of the basic management information.

(11)

A drive controlling method, including the step of:

recording pieces of basic management information in a write-once recording medium, the basic management information storing information on a recording range of the recording medium, the basic management information storing a counter showing the number of times of updating content of the basic management information.

(12)

A write-once recording medium, including:

a recording range; and management areas that record basic management information storing information on the recording range, the basic management information storing a counter showing the number of times of updating content of the basic management information.

(13)

The recording medium according to (12), further including:

a first surface capable of recording data and a second surface capable of recording data, in which the first surface and the second surface respectively include the management areas.

(14)

The recording medium according to (12) or (13), in which the basic management information contains no pointer information showing a recording location of information contained in the basic management information.

(15)

The recording medium according to any one of (12) to (14), in which when the basic management information having a predetermined size cannot store the information on the recording range anymore, extended management information and new basic management information are further recorded in the management areas, the extended management information storing the information on the recording range, the information on the recording range having been stored in the basic management information, the new basic management information storing pointer information showing a recording location of the extended management information in the recording medium.

(16)

The recording medium according to (15), in which the new basic management information is recorded in the management areas after the extended management information is recorded in the management areas.

(17)

The recording medium according to (15) or (16), in which the counter stored in the basic management information includes a counter showing the number of times of updating content of the basic management information and a counter showing the number of times of updating content of the extended management information.

(18)

The recording medium according to any one of (12) to (17), in which the basic management information is recorded in the management areas before the recording medium is finalized.

Description of Numerals 11 recording and reproducing apparatus, 12 optical disc, 22 controller, 23 memory, 24-1, 24-2, 24 recording and reproducing processor, 25-1, 25-2, 25 optical pickup, 41 manager, 42 alternating processing unit.

The invention claimed is:

1. A recording control apparatus, comprising:
    a recording controller that controls recording of data in a write-once recording medium; and
    a manager that controls the recording controller to record pieces of basic management information in the recording medium, the basic management information storing information on a recording range of the recording medium, the basic management information storing a counter showing the number of times of updating content of the basic management information,
    wherein the basic management information contains no pointer information showing a recording location of information contained in the basic management information.

2. The recording control apparatus according to claim 1, wherein
    the recording medium includes a first surface capable of recording data and a second surface capable of recording data, and
    the manager records the basic management information in the first surface and the second surface.

3. A recording control apparatus, comprising:
    a recording controller that controls recording of data in a write-once recording medium; and
    a manager that controls the recording controller to record pieces of basic management information in the recording medium, the basic management information storing information on a recording range of the recording medium, the basic management information storing a counter showing the number of times of updating content of the basic management information,
    wherein the manager records, when the basic management information having a predetermined size cannot store the information on the recording range anymore, extended management information and new basic management information in the recording medium, the extended management information storing the information on the recording range, the information on the recording range having been stored in the basic management information, the new basic management information storing pointer information showing a recording location of the extended management information in the recording medium.

4. The recording control apparatus according to claim 3, wherein
    the manager records the new basic management information after the manager records the extended management information.

5. The recording control apparatus according to claim 3, wherein
    the counter stored in the basic management information includes a counter showing the number of times of updating content of the basic management information and a counter showing the number of times of updating content of the extended management information.

6. The recording control apparatus according to claim 1, wherein
    the pieces of basic management information are recorded in the recording medium before the recording medium is finalized.

7. A recording control method, comprising the step of:
    controlling a recording controller that controls recording of data in a write-once recording medium to record pieces of basic management information in the recording medium, the basic management information storing information on a recording range of the recording medium, the basic management information storing a counter showing the number of times of updating content of the basic management information,
    wherein the basic management information contains no pointer information showing a recording location of information contained in the basic management information.

8. A non-transitory computer-readable medium having embodied thereon a program, which when executed by a computer causes the computer to execute a method, the method comprising:
    controlling a recording controller that controls recording of data in a write-once recording medium to record pieces of basic management information in the recording medium, the basic management information storing information on a recording range of the recording medium, the basic management information storing a counter showing the number of times of updating content of the basic management information,
    wherein the basic management information contains no pointer information showing a recording location of information contained in the basic management information.

9. A drive controlling controller, comprising:
a manager that records pieces of basic management information in a write-once recording medium, the basic management information storing information on a recording range of the recording medium, the basic management information storing a counter showing the number of times of updating content of the basic management information,
wherein the basic management information contains no pointer information showing a recording location of information contained in the basic management information.

10. A drive controlling method, comprising the step of:
recording pieces of basic management information in a write-once recording medium, the basic management information storing information on a recording range of the recording medium, the basic management information storing a counter showing the number of times of updating content of the basic management information,
wherein the basic management information contains no pointer information showing a recording location of information contained in the basic management information.

11. A write-once recording medium, comprising:
a recording range; and
management areas that record basic management information storing information on the recording range, the basic management information storing a counter showing the number of times of updating content of the basic management information,
wherein the basic management information contains no pointer information showing a recording location of information contained in the basic management information.

12. The recording medium according to claim 11, further comprising:
a first surface capable of recording data and a second surface capable of recording data, wherein
the first surface and the second surface respectively include the management areas.

13. A write-once recording medium claim 12, comprising:
a recording range; and
management areas that record basic management information storing information on the recording range, the basic management information storing a counter showing the number of times of updating content of the basic management information,
wherein when the basic management information having a predetermined size cannot store the information on the recording range anymore, extended management information and new basic management information are further recorded in the management areas, the extended management information storing the information on the recording range, the information on the recording range having been stored in the basic management information, the new basic management information storing pointer information showing a recording location of the extended management information in the recording medium.

14. The recording medium according to claim 13, wherein the new basic management information is recorded in the management areas after the extended management information is recorded in the management areas.

15. The recording medium according to claim 13, wherein the counter stored in the basic management information includes a counter showing the number of times of updating content of the basic management information and a counter showing the number of times of updating content of the extended management information.

16. The recording medium according to claim 11, wherein the basic management information is recorded in the management areas before the recording medium is finalized.

17. The recording control apparatus according to claim 3, wherein
the recording medium includes a first surface capable of recording data and a second surface capable of recording data, and
the manager records the basic management information in the first surface and the second surface.

18. The recording control apparatus according to claim 3, wherein
the pieces of basic management information are recorded in the recording medium before the recording medium is finalized.

19. The recording control method according to claim 7, wherein
the basic management information is recorded in a first surface of the recording medium capable of recording data, and in a second surface of the recording medium capable of recording data.

20. The recording control method according to claim 7, wherein
the pieces of basic management information are recorded in the recording medium before the recording medium is finalized.

21. A recording control method, comprising the step of:
controlling a recording controller that controls recording of data in a write-once recording medium to record pieces of basic management information in the recording medium, the basic management information storing information on a recording range of the recording medium, the basic management information storing a counter showing the number of times of updating content of the basic management information,
wherein, when the basic management information having a predetermined size cannot store the information on the recording range anymore, extended management information and new basic management information are recorded in the recording medium, the extended management information storing the information on the recording range, the information on the recording range having been stored in the basic management information, the new basic management information storing pointer information showing a recording location of the extended management information in the recording medium.

22. The recording control method according to claim 21, wherein
the basic management information is recorded in a first surface of the recording medium capable of recording data, and in a second surface of the recording medium capable of recording data.

23. The recording control method according to claim 21, wherein
the pieces of basic management information are recorded in the recording medium before the recording medium is finalized.

24. The recording control method according to claim 21, wherein
the new basic management information is recorded after the extended management information is recorded.

25. The recording control method according to claim 21, wherein the counter stored in the basic management information includes a counter showing the number of times of updating content of the basic management information and a counter showing the number of times of updating content of the extended management information.

26. The non-transitory computer-readable medium according to claim 8, wherein
the basic management information is recorded in a first surface of the recording medium capable of recording data, and in a second surface of the recording medium capable of recording data.

27. The non-transitory computer-readable medium according to claim 8, wherein
the pieces of basic management information are recorded in the recording medium before the recording medium is finalized.

28. A non-transitory computer-readable medium having embodied thereon a program, which when executed by a computer causes the computer to execute a method, the method comprising:
controlling a recording controller that controls recording of data in a write-once recording medium to record pieces of basic management information in the recording medium, the basic management information storing information on a recording range of the recording medium, the basic management information storing a counter showing the number of times of updating content of the basic management information,
wherein, when the basic management information having a predetermined size cannot store the information on the recording range anymore, extended management information and new basic management information are recorded in the recording medium, the extended management information storing the information on the recording range, the information on the recording range having been stored in the basic management information, the new basic management information storing pointer information showing a recording location of the extended management information in the recording medium.

29. The non-transitory computer-readable medium according to claim 28, wherein
the basic management information is recorded in a first surface of the recording medium capable of recording data, and in a second surface of the recording medium capable of recording data.

30. The non-transitory computer-readable medium according to claim 28, wherein
the pieces of basic management information are recorded in the recording medium before the recording medium is finalized.

31. The non-transitory computer-readable medium according to claim 28, wherein
the new basic management information is recorded after the extended management information is recorded.

32. The non-transitory computer-readable medium according to claim 28, wherein
the counter stored in the basic management information includes a counter showing the number of times of updating content of the basic management information and a counter showing the number of times of updating content of the extended management information.

33. The drive controlling controller according to claim 9, wherein
the recording medium includes a first surface capable of recording data and a second surface capable of recording data, and
the manager records the basic management information in the first surface and the second surface.

34. The drive controlling controller according to claim 9, wherein
the pieces of basic management information are recorded in the recording medium before the recording medium is finalized.

35. A drive controlling controller, comprising:
a manager that records pieces of basic management information in a write-once recording medium, the basic management information storing information on a recording range of the recording medium, the basic management information storing a counter showing the number of times of updating content of the basic management information,
wherein the manager records, when the basic management information having a predetermined size cannot store the information on the recording range anymore, extended management information and new basic management information in the recording medium, the extended management information storing the information on the recording range, the information on the recording range having been stored in the basic management information, the new basic management information storing pointer information showing a recording location of the extended management information in the recording medium.

36. The drive controlling controller according to claim 35, wherein
the recording medium includes a first surface capable of recording data and a second surface capable of recording data, and
the manager records the basic management information in the first surface and the second surface.

37. The drive controlling controller according to claim 35, wherein
the pieces of basic management information are recorded in the recording medium before the recording medium is finalized.

38. The drive controlling controller according to claim 35, wherein
the manager records the new basic management information after the manager records the extended management information.

39. The drive controlling controller according to claim 35, wherein
the counter stored in the basic management information includes a counter showing the number of times of updating content of the basic management information and a counter showing the number of times of updating content of the extended management information.

40. The drive controlling method according to claim 10, wherein
the basic management information is recorded in a first surface of the recording medium capable of recording data, and in a second surface of the recording medium capable of recording data.

41. The drive controlling method according to claim 10, wherein
the pieces of basic management information are recorded in the recording medium before the recording medium is finalized.

42. A drive controlling method, comprising the step of:
recording pieces of basic management information in a write-once recording medium, the basic management information storing information on a recording range of the recording medium, the basic management information storing a counter showing the number of times of updating content of the basic management information,
wherein, when the basic management information having a predetermined size cannot store the information on the recording range anymore, extended management information and new basic management information are recorded in the recording medium, the extended management information storing the information on the recording range, the information on the recording range having been stored in the basic management information, the new basic management information storing pointer information showing a recording location of the extended management information in the recording medium.

43. The drive controlling method according to claim 42, wherein
the basic management information is recorded in a first surface of the recording medium capable of recording data, and in a second surface of the recording medium capable of recording data.

44. The drive controlling method according to claim 42, wherein
the pieces of basic management information are recorded in the recording medium before the recording medium is finalized.

45. The drive controlling method according to claim 42, wherein
the new basic management information is recorded after the extended management information is recorded.

46. The drive controlling method according to claim 42, wherein
the counter stored in the basic management information includes a counter showing the number of times of updating content of the basic management information and a counter showing the number of times of updating content of the extended management information.

47. The recording medium according to claim 13, further comprising:
a first surface capable of recording data and a second surface capable of recording data, wherein
the first surface and the second surface respectively include the management areas.

48. The recording medium according to claim 13, wherein
the basic management information is recorded in the management areas before the recording medium is finalized.

\* \* \* \* \*